United States Patent
Mukherjee et al.

(10) Patent No.: US 12,299,022 B2
(45) Date of Patent: May 13, 2025

(54) LANGUAGE MODEL-BASED DATA OBJECT EXTRACTION AND VISUALIZATION

(71) Applicant: Palantir Technologies Inc., Denver, CO (US)

(72) Inventors: Anirvan Mukherjee, Brooklyn, NY (US); Craig De Souza, Jersey City, NJ (US); Edgar Gomes de Araujo, São Paulo (BR); Johannes Beil, Copenhagen (DK); Jessica Winssinger, New York, NY (US); Michael Zullo, Scarsdale, NY (US); Rushad Heerjee, New York, NY (US); Shubhankar Sachdev, New York, NY (US)

(73) Assignee: Palantir Technologies Inc., Denver, CO (US)

( * ) Notice: Subject to any disclaimer, the term of this patent is extended or adjusted under 35 U.S.C. 154(b) by 0 days.

(21) Appl. No.: 18/632,900

(22) Filed: Apr. 11, 2024

(65) Prior Publication Data
US 2024/0354322 A1    Oct. 24, 2024

Related U.S. Application Data

(60) Provisional application No. 63/589,894, filed on Oct. 12, 2023, provisional application No. 63/589,911, (Continued)

(51) Int. Cl.
*G06F 16/00* (2019.01)
*G06F 16/334* (2025.01)
(Continued)

(52) U.S. Cl.
CPC ...... *G06F 16/3344* (2019.01); *G06F 18/2415* (2023.01); *G06N 3/0895* (2023.01)

(58) Field of Classification Search
CPC ..................................................... G06F 16/3344
(Continued)

(56) References Cited

U.S. PATENT DOCUMENTS 8,572,101 B2   10/2013   Srinivasa et al.
9,251,225 B2    2/2016   Stanfill
(Continued)

OTHER PUBLICATIONS

U.S. Appl. No. 18/632,958, Language Model-Based Tabular Data Object Extraction and Visualization, filed Apr. 11, 2024.

*Primary Examiner* — Chelcie L Daye
(74) *Attorney, Agent, or Firm* — Knobbe, Martens, Olson & Bear, LLP

(57) ABSTRACT

Computer-implemented systems and methods are disclosed, including systems and methods utilizing language models for generating data objects and/or updating an ontology. A computer-implemented method may include: employing one or more large language models ("LLMs") to generate at least a data triple and a classified triple; executing, using the classified triple, a similarity search with reference to an ontology to determine that the classified triple at least partially matches one or more data object types defined in the ontology; in response to the determination, adding into a first database at least a first data object of a first data object type that represents a first entity in the data triple and a second data object of a second data object type that represents a second entity in the data triple.

20 Claims, 16 Drawing Sheets

Related U.S. Application Data filed on Oct. 12, 2023, provisional application No. 63/497,930, filed on Apr. 24, 2023, provisional application No. 63/497,933, filed on Apr. 24, 2023.

(51) Int. Cl.
*G06F 18/2415* (2023.01)
*G06N 3/0895* (2023.01)

(58) Field of Classification Search
USPC .......................................................... 707/737
See application file for complete search history.

(56) References Cited

U.S. PATENT DOCUMENTS

| | | |
|---|---|---|
| 9,582,554 B2 | 2/2017 | Sekharan |
| 9,798,829 B1 | 10/2017 | Baisley |
| 10,191,946 B2 | 1/2019 | Guggilla et al. |
| 10,698,905 B2 * | 6/2020 | Ali ........................ G06F 16/243 |
| 10,706,045 B1 | 7/2020 | Hasija et al. |
| 11,080,295 B2 | 8/2021 | Chang et al. |

* cited by examiner

1004 — Input text
Enter input text into the text area below and create a graph visual:

1002 → Bob Earned a Bachelor's Degree from ABC College in 2004.
Bob Received a PhD Degree from DEF College in 2016.
While Studying in DEF College, Bob is a Roommate of Alice.

FIG. 10A

1006 → ["Bob", "earned", "bachelor's degree"]

1008 → ["Bob", "received", "PhD degree"]

1010 → ["ABC College", "awarded", "bachelor's degree"]

1012 → ["DEF College", "awarded", "PhD degree"]

1014 → ["Bob", "roommate", "Alice"]

FIG. 10B

1016 → ["Person", "earned", "educational degree"]

1018 → ["Organization", "awarded", "educational degree"]

1020 → ["Person", "roommate", "person"]

FIG. 10C

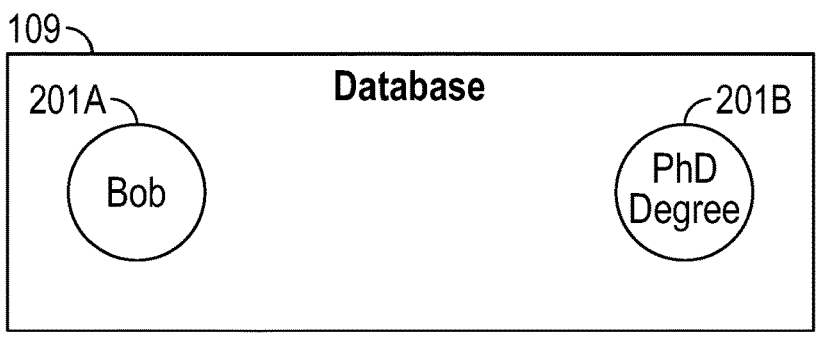

LANGUAGE MODEL-BASED DATA OBJECT EXTRACTION AND VISUALIZATION

CROSS-REFERENCE TO RELATED APPLICATIONS

This application claims benefit of U.S. Provisional Patent Application No. 63/497,933, filed Apr. 24, 2023, and titled "LANGUAGE MODEL-BASED DATA ONTOLOGY GENERATION," and U.S. Provisional Patent Application No. 63/497,930, filed Apr. 24, 2023, and titled "LANGUAGE MODEL-BASED DATA OBJECT EXTRACTION AND VISUALIZATION," U.S. Provisional Patent Application No. 63/589,894, filed Oct. 12, 2023, and titled "LANGUAGE MODEL-BASED TABULAR DATA OBJECT EXTRACTION AND VISUALIZATION," and U.S. Provisional Patent Application No. 63/589,911, filed Oct. 12, 2023, and titled "LANGUAGE MODEL-BASED DATA OBJECT EXTRACTION AND VISUALIZATION." The entire disclosure of each of the above items is hereby made part of this specification as if set forth fully herein and incorporated by reference for all purposes, for all that it contains.

Any and all applications for which a foreign or domestic priority claim is identified in the Application Data Sheet as filed with the present application are hereby incorporated by reference under 37 CFR 1.57 for all purposes and for all that they contain.

TECHNICAL FIELD

The present disclosure relates to systems and techniques for utilizing computer-based models. More specifically, the present disclosure relates to computerized systems and techniques for creating or updating an ontology based on unstructured data.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Computers can be programmed to perform calculations and operations utilizing one or more computer-based models. A computer-based ontology may be used to model a view of, or provide a template for, what objects exist in the world, what their properties are, and how they are related to each other.

SUMMARY

The systems, methods, and devices described herein each have several aspects, no single one of which is solely responsible for its desirable attributes. Without limiting the scope of this disclosure, several non-limiting features will now be described briefly.

For ease of discussion, certain implementations described herein relate to using an LLM-based unstructured data processing pipeline to generate classified triples and generate corresponding data objects if the classified triples match an ontology, and UI-based functionality for processing unmatched classified triples, updating the ontology accordingly, and then generating data objects based on the updated ontology. Because current processes of updating an ontology usually include performing various unintegrated or fragmented steps, certain implementations described herein utilize an automated pipeline for updating an ontology or one or more databases associated with the ontology based on data received from data source(s) in a manner that is consistent with existing definitions in the ontology.

The present disclosure relates to systems and methods (generally collectively referred to herein as "a data extraction system" or simply a "system") that can advantageously utilize machine learning, natural language processing, and/or interactive visualization techniques to automatically aggregate information received from data source(s) into database(s) as data objects of data object types defined by an ontology, or allow users to efficiently update the ontology to include data object types for representing information that was previously undefined by the ontology. Advantageously, the system can streamline the process of enriching databases or updating the ontology through automation to generate customized or updated ontology in a short period of time. Additionally, the system can more reliably or repeatedly update the ontology based on new information by employing one or more large language models ("LLMs") and data analysis techniques to extract, classify, match and/or process data from data sources (e.g., texts, documents, emails, article, or the like). Further, the system can present interactive graphical user interface(s) through visualization techniques to allow users more easily and efficiently identify relevant information and key relationships contained in data from data sources for updating the ontology in consistent with objectives of an organization.

Various implementations of the present disclosure provide improvements to various technologies and technological fields. For example, as described above, the system may advantageously use an LLM-based unstructured data processing pipeline to generate classified triples and generate corresponding data objects if the classified triples match an ontology. Other technical benefits provided by various implementations of the present disclosure include, for example, providing UI-based functionality for efficiently processing unmatched classified triples, updating the ontology accordingly, and then generating data objects based on the updated ontology.

Additionally, various implementations of the present disclosure are inextricably tied to computer technology. In particular, various implementations rely on detection of user inputs via graphical user interfaces, calculation of updates to displayed electronic data based on those user inputs, automatic processing of related electronic data, application of language models and/or other artificial intelligence, and presentation of the updates to displayed information via interactive graphical user interfaces. Such features and others (e.g., processing and analysis of large amounts of electronic data) are intimately tied to, and enabled by, computer technology, and would not exist except for computer technology. For example, the interactions with displayed data described below in reference to various implementations cannot reasonably be performed by humans alone, without the computer technology upon which they are implemented. Further, the implementation of the various implementations of the present disclosure via computer technology enables many of the advantages described herein, including more efficient interaction with, and presentation of, various types of electronic data.

According to various implementations, large amounts of data are automatically and dynamically calculated interactively in response to user inputs, and the calculated data is efficiently and compactly presented to a user by the system.

Thus, in some implementations, the user interfaces described herein are more efficient as compared to previous user interfaces in which data is not dynamically updated and compactly and efficiently presented to the user in response to interactive inputs.

Further, as described herein, the system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

Additionally, it has been noted that design of computer user interfaces that are useable and easily learned by humans is a non-trivial problem for software developers. The present disclosure describes various implementations of interactive and dynamic user interfaces that are the result of significant development. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user. For example, user interaction with the interactive user interface via the inputs described herein may provide an optimized display of, and interaction with, models and model-related data, and may enable a user to more quickly and accurately access, navigate, assess, and digest the model-related data than previous systems.

Further, the interactive and dynamic user interfaces described herein are enabled by innovations in efficient interactions between the user interfaces and underlying systems and components. For example, disclosed herein are improved methods for utilizing machine learning, natural language processing, and/or interactive visualization techniques to automatically aggregate information received from data source(s) into database(s) as data objects of data object types defined by an ontology, or allow users to efficiently update the ontology to include data object types for representing information that was previously undefined by the ontology. Advantageously, the system can streamline the process of enriching databases or updating the ontology through automation to generate customized or updated ontology in a short period of time. Additionally, the system can more reliably or repeatedly update the ontology based on new information by employing one or more large language models ("LLMs") and data analysis techniques to extract, classify, match and/or process data from data sources (e.g., texts, documents, emails, article, or the like). Further, the system can present interactive graphical user interface(s) through visualization techniques to allow users more easily and efficiently identify relevant information and key relationships contained in data from data sources for updating the ontology in consistent with objectives of an organization.

Thus, various implementations of the present disclosure can provide improvements to various technologies and technological fields, and practical applications of various technological features and advancements. For example, as described above, existing computer-based model management and integration technology is limited in various ways, and various implementations of the disclosure provide significant technical improvements over such technology. Additionally, various implementations of the present disclosure are inextricably tied to computer technology. In particular, various implementations rely on operation of technical computer systems and electronic data stores, automatic processing of electronic data, and the like. Such features and others (e.g., processing and analysis of large amounts of electronic data, management of data migrations and integrations, and/or the like) are intimately tied to, and enabled by, computer technology, and would not exist except for computer technology. For example, the interactions with, and management of, computer-based models described below in reference to various implementations cannot reasonably be performed by humans alone, without the computer technology upon which they are implemented. Further, the implementation of the various implementations of the present disclosure via computer technology enables many of the advantages described herein, including more efficient management of various types of electronic data (including computer-based models).

Various combinations of the above and below recited features, embodiments, implementations, and aspects are also disclosed and contemplated by the present disclosure.

Additional implementations of the disclosure are described below in reference to the appended claims, which may serve as an additional summary of the disclosure.

In various implementations, systems and/or computer systems are disclosed that comprise one or more computer-readable storage mediums having program instructions embodied therewith, and one or more processors configured to execute the program instructions to cause the systems and/or computer systems to perform operations comprising one or more aspects of the above- and/or below-described implementations (including one or more aspects of the appended claims).

In various implementations, computer-implemented methods are disclosed in which, by one or more processors executing program instructions, one or more aspects of the above- and/or below-described implementations (including one or more aspects of the appended claims) are implemented and/or performed.

In various implementations, computer program products comprising one or more computer-readable storage mediums are disclosed, wherein the computer-readable storage medium(s) have program instructions embodied therewith, the program instructions executable by one or more processors to cause the one or more processors to perform operations comprising one or more aspects of the above- and/or below-described implementations (including one or more aspects of the appended claims).

BRIEF DESCRIPTION OF THE DRAWINGS

The following drawings and the associated descriptions are provided to illustrate implementations of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

FIGS. 10A-10D show an example flow for adding a data object into a database associated with an ontology using a classified triple extracted from input text data that matches the ontology, according to various implementations of the present disclosure;

FIGS. 11, 12, 13, 14, and 15 are illustrations of example user interfaces of the data extraction system, according to various implementations of the present disclosure.

DETAILED DESCRIPTION

Figure 1:
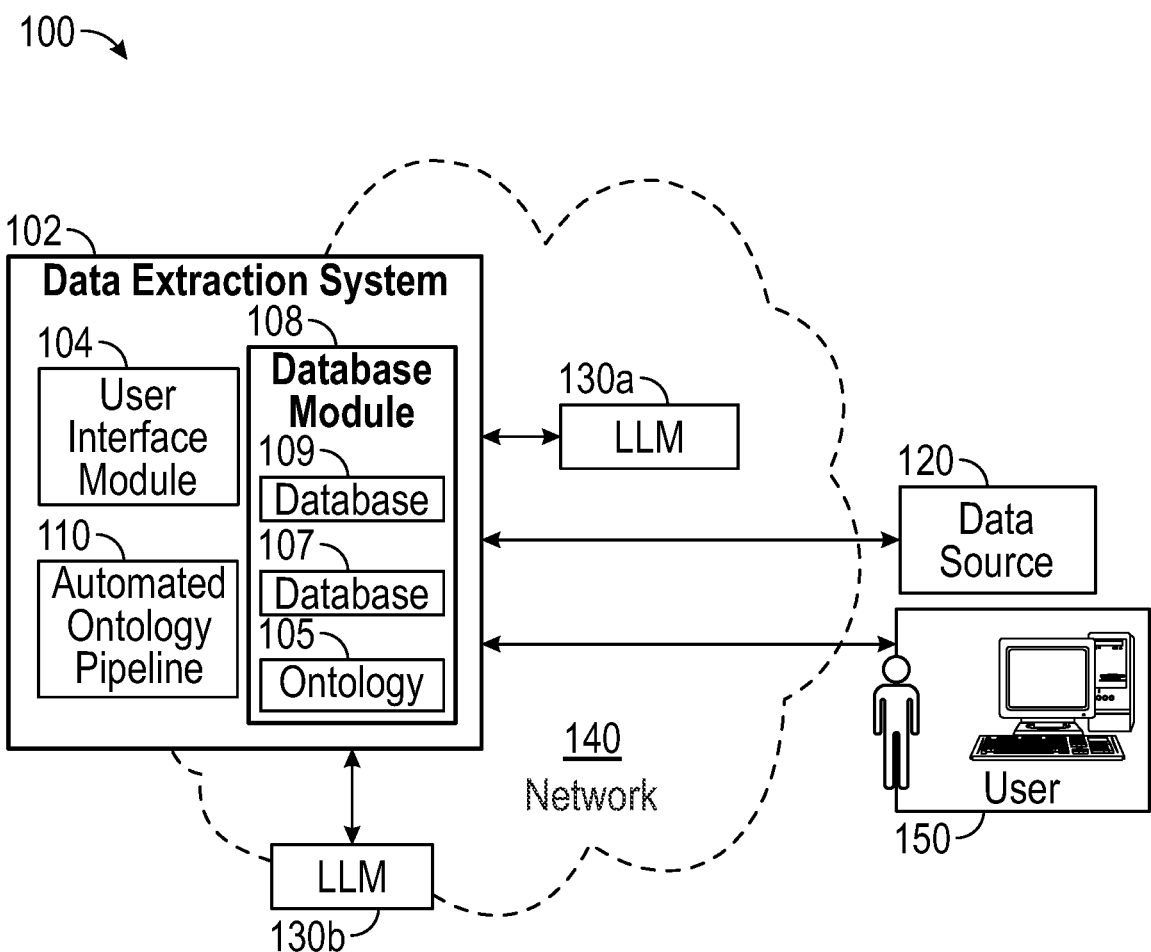
FIG. 1 is a block diagram illustrating an example data extraction system in an example computing environment, according to various implementations of the present disclosure.

Although certain preferred implementations, embodiments, and examples are disclosed below, the inventive subject matter extends beyond the specifically disclosed implementations to other alternative implementations and/or uses and to modifications and equivalents thereof. Thus, the scope of the claims appended hereto is not limited by any of the particular implementations described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain implementations; however, the order of description should not be construed to imply that these operations are order dependent. Additionally, the structures, systems, and/or devices described herein may be embodied as integrated components or as separate components. For purposes of comparing various implementations, certain aspects and advantages of these implementations are described. Not necessarily all such aspects or advantages are achieved by any particular implementation. Thus, for example, various implementations may be carried out in a manner that achieves or optimizes one advantage or group of advantages as taught herein without necessarily achieving other aspects or advantages as may also be taught or suggested herein.

Overview

A computer-based ontology may be used to model a view of, or provide a template for, what objects exist in the world, what their properties are, and how they are related to each other. Once created, an ontology may need to be updated or expanded in consistent with its existing models or definitions to meet evolving needs of an organization to process new knowledge. However, creation or update of an ontology to enrich databases of an organization often requires complex processes and may present several technical challenges. For example, current processes of updating an ontology usually include performing various unintegrated or fragmented steps and may be time consuming. Further, steps for updating an ontology may not be easily repeatable across various updates or may be performed less accurately or reliably.

As noted above, the present disclosure describes examples of a data extraction system (or simply a "system") that can advantageously overcome various of the technical challenges mentioned above, among other technical challenges. For example, various implementations of the systems and methods of the present disclosure can advantageously utilize machine learning, natural language processing, and/or interactive visualization techniques to automatically aggregate information received from data source(s) into database(s) as data objects of data object types defined by an ontology, or allow users to efficiently update the ontology to include data object types for representing information that was previously undefined by the ontology. As such, the system can streamline the process of enriching databases or updating the ontology through automation to generate a customized or updated ontology in a short period of time. Additionally, the system can more reliably or repeatedly update the ontology based on new information by employing one or more large language models ("LLMs") and data analysis techniques to extract, classify, match and/or process data from data sources (e.g., texts, documents, emails, article, or the like). Further, the system can present interactive graphical user interface(s) through visualization techniques to allow users more easily and efficiently identify relevant information and key relationships contained in data from data sources for updating the ontology in consistent with objectives of an organization.

More specifically, the system can utilize an automated ontology pipeline for updating an ontology or one or more databases associated with the ontology based on data received from data source(s) in a manner that is consistent with existing definitions in the ontology. The system may receive text data and employ one or more LLMs to extract information and identify relationship among entities (e.g., persons, institutions, organizations, places, or other nouns) in the text data for generating data of particular structures, such as data triples (e.g., a data triple may include a person entity, a place entity, and a relationship between the person entity and the place entity), and classifying data triples to generate classified triples (e.g., a classified triple may include a person entity type, a place entity type, and a relationship type between a person entity type and a place entity type). The system may further employ various data processing techniques (e.g., normalization, vectorization, similarity search) to more accurately search and identify classified triples that partially or fully match one or more data object types defined in an ontology.

Using various techniques described herein, the system can advantageously reduce time and human labor required for updating an ontology or enriching database(s) of an organization by using the automated ontology pipeline to process unstructured data (e.g., emails, articles, documents, texts, or the like) for generating classified triples from data triples and generating corresponding data objects if the classified triples match an ontology. Additionally, the system can further advantageously enable users to more efficiently updating an ontology by providing UI-based functionality for processing unmatched classified triples, updating the ontology accordingly, and then generating data objects based on the updated ontology.

Example Aspects Related to Adding Data Objects Automatically

As noted above, the system may search and identify classified triples that partially or fully match one or more data object types defined in an ontology. In various implementations, when the system determines that a first entity type in a classified triple matches a first data object type defined in the ontology, the system may automatically add a first data object of the first data object type into a database associated with the ontology, where the first data object may represent a first entity that is classified to the first entity type, the first entity being in a data triple from which the classified triple is generated.

More specifically, the system may receive text data from one or more data sources, where the text data may be any texts, documents, emails, article, or the like, or any combination thereof. For example, the text data may include one or more natural language words, sentences, paragraphs, or the like. Based on the text data, the system may generate a first prompt for a LLM, where the first prompt may include at least the text data. The system may then transmit the first prompt to the LLM, and receive a first output from the LLM in response to the first prompt, where the first output may include at least a data triple extracted from the text data and the data triple may include a first entity, a second entity, and a relationship between the first entity and the second entity. For example, the text data may include at least a sentence "While studying in XYZ college, Bob was a roommate of Alice" and the data triple in the first output of the LLM may include ["Bob", "roommate", "Alice" ]. In this example, the data triple may include the first entity (e.g., "Bob"), the second entity (e.g., "Alice"), and a relationship (e.g., "roommate") between the first entity and the second entity.

Optionally, the first prompt may further include example text data and an example data triple that is extracted from the example text data to provide guidance to the LLM in extracting one or more data triples from text data. For example, in addition to the text data, the first prompt may include example text data "John earned bachelor's degree in 1969" and an example data triple ["John", "earned", "bachelor's degree" ] that is extracted from the example text data. Additionally and optionally, the system may provide, via a user interface, a first graphical representation of the first output from the LLM, where the first entity (e.g., "Bob") may be represented as a first node, the second entity (e.g., "Alice") may be represented as a second node, and the relationship (e.g., "roommate") between the first entity and the second entity may be represented as an edge connecting the first node and the second node. As such, users may more easily understand entities and/or relationships within data triples through visualization.

Based on the data triple in the first output from the LLM, the system may further generate a second prompt for the LLM, where the second prompt may include at least the data triple. The system may then transmit the second prompt to the LLM, and receive a second output from the LLM, where the second output may include at least a classified triple and the classified triple may include a first entity type that the first entity is classified to, a second entity type that the second entity is classified to, and a relationship type that the relationship between the first entity and the second entity is classified to. For example, the classified triple may include ["Person", "roommate", "Person" ], where "Person" is the first entity type that the first entity (e.g., "Bob") is classified to, "Person" is the second entity type that the second entity (e.g., "Alice") is classified to, and "roommate" is the relationship type that the relationship (e.g., "roommate") is classified to. It should be noted that the LLM can be various types of LLM, such as GPT-2, GPT-3, GPT-3.5, or the like. Alternatively, the system may transmit the first prompt and the second prompt to different LLMs, and receive the first output and the second output from different LLMs.

Optionally, the second prompt may further include example classification that classifies an example data triple to an example classified triple to provide guidance to the LLM in classifying one or more data triples to one or more classified triples. For example, in addition to the data triple, the second prompt may include an example data triple ["Alice", "works for", "XYZ company" ] and an example classified triple ["Person", "works", "Company" ] that is obtained by classifying the example data triple. Additionally and optionally, the second prompt may provide a plurality of data object types defined in the ontology and request that the LLM to classify the data triple into the classified triple using the plurality of data object types. For example, the second prompt may provide to the LLM that "Use example entity types listed below if possible: Person, Company, Location, Date, Organization . . . ," where each of the example entity types may match a data object type defined in the ontology.

Additionally and optionally, the system may provide, via a user interface, a second graphical representation of the second output from the LLM, where the first entity type (e.g., "Person") may be represented as a first node, the second entity (e.g., "Person") may be represented as a second node, and the relationship type (e.g., "roommate") between the first entity type and the second entity type may be represented as an edge connecting the first node and the second node. As such, users may more easily understand entities and/or relationships within classified triples through visualization.

Using the classified triple, the system may execute a similarity search with reference to the ontology to determine whether the classified triple at least partially matches one or more data object types defined in the ontology. The system may execute the similarity search using one of the cosine similarity search, approximate nearing neighbor (ANN) algorithms, k nearest neighbors (KNN) method, locality sensitive hashing (LSH), range queries, or any other vector clustering and/or similarity search algorithms. In various implementations, the system may determine that the classified triple at least partially matches one or more data object types defined in the ontology when the system determines that (1) a first entity type of the classified triple matches a first data object type defined in the ontology, (2) a second entity type of the classified triple matches a second data object type defined in the ontology, and (3) a relationship type of the classified triple matches a link type between the first data object type and the second data object type, where the link type is defined in the ontology. In various examples, the system may determine that the first entity type matches the first data object type if the first entity type exceeds a threshold similarity with the first data object type.

Additionally and optionally, the system may normalize the relationship type of the classified triple prior to executing the similarity search with reference to the ontology. For example, relationship types of "lives" and "lived" may both be normalized to a relationship type "live" that is defined in the ontology. Additionally and optionally, the system may vectorize the relationship type of the classified triple to a vector in preparation for the execution of the similarity search. Advantageously, the vectorization and/or normalization of at least a portion of the classified triple may enable the system to more accurately extract, classify, identify, or search information within text data for adding data objects or updating an ontology in consistent with definitions of the ontology and/or objectives of an organization.

In response to determining that the classified triple at least partially matches one or more data object types defined in the ontology, the system may add into a database a first data object of the first data object type and a second data object of the second data object type, where the first data object represents the first entity (e.g., "Bob") of the data triple and the second data object represents the second entity (e.g., "Alice") of the data triple. Additionally and optionally, the system may add into the database a link of the link type that links the first data object and the second data object, where the link represents the relationship (e.g., "roommate") between the first entity and the second entity. Advantageously, the system may automatically generate classified triples based on text data and generate data objects corresponding to entities and/or relationships described in the text data if the classified triples at least partially match one or more data object types defined in the ontology, thereby saving time and labor that otherwise may be required for adding data objects into database(s) associated with the ontology.

Alternatively, the system may execute a similarity search with reference to the ontology and determine that the classified triple does not partially match one or more data object types defined in the ontology. In various implementations, the system may determine that the classified triple does not partially match one or more data object types defined in the ontology if the system determines that (1) the first entity type (e.g., "Person") of the classified triple or the second entity type (e.g., "Person") of the classified triple does not match any data object type defined in the ontology, or (2) the relationship type (e.g., "roommate") does not match any link type between one or more data object types defined in the ontology. In response to determining that the classified triple does not partially match one or more data object types defined in the ontology, the system may optionally store the classified triple into a database that stores a plurality of unmatched classified triples.

Example Aspects Related to Updating an Ontology Through Interactive Visualization As noted above, the system may provide UI-based functionality (e.g., a graphical user interface ("GUI") or other types of user interfaces) for processing unmatched classified triples, updating the ontology accordingly, and then generating data objects based on the updated ontology. For example, when the system determines that an entity type in a classified triple does not match any data object type defined in the ontology, the system may automatically store the classified triple into database(s) that store a plurality of unmatched classified data triples, and provide an interactive graphical representation of at least a portion of the plurality of unmatched classified data triples. The interactive graphical representation may include a graph-based visualization including a plurality of nodes and a plurality of edges, where the nodes may represent entity types that do not match any data object type defined in the ontology and/or the edges may represent relationship types that do not match any link type between one or more data object types defined in the ontology. By performing various operations (e.g., select, drag, move, group, or the like) on the nodes or edges of the interactive graphical representation, users may more easily update the ontology to define new object types or link types for enriching knowledge base of an organization in line with objective of the organization. Based on new object types defined in the ontology, the system may further automatically generate new data objects of the new data object types to represent entities of entity types that did not match any data object type defined in the ontology before the update.

More specifically, the system may access one or more databases that store a plurality of unmatched classified triples. The plurality of unmatched classified triples may include a first subset, where each of the first subset of the plurality of unmatched classified triples may include a first entity type, a second entity type, and a relationship type between the first entity type and the second entity type, and the first entity type or the second entity type does not match any data object type defined in an ontology, or the relationship type does not match any link type between one or more data object types defined in the ontology.

Based at least on the first entity type, the second entity type, and the relationship type of each of the first subset of the plurality of unmatched classified triples, the system may cluster each of the first subset of the plurality of unmatched classified triples into a first cluster of unmatched classified triples. The system may further provide, via a user interface, an interactive graphical representation of the first cluster of unmatched classified triples, where the interactive graphical representation includes at least a first node representing the first entity type, a second node representing the second entity type, and a first edge connecting the first node and the second node.

The system may then receive a first user operation, made via the interactive graphical representation of the user interface, to at least the first node. Based at least in part on receiving the first user operation, the system may update the ontology to include a first data object type corresponding to the first entity type represented by the first node. In various implementations, the first user operation may indicate that the first entity type represented by the first node is to be defined in the ontology as the first data object type, and the system may update the ontology by defining the first data object type in the ontology. Additionally and optionally, based at least in part on updating the ontology, the system may add into one or more databases a first data object of the first data object type, where the first data object may represent a first entity of a data triple from which one of the first subset of the plurality of unmatched classified triples is classified.

As noted above, the system may provide an interactive graphical representation of at least a portion of the plurality of unmatched classified data triples. The interactive graphical representation may include a graph-based visualization including a plurality of nodes and a plurality of edges, where the nodes may represent entity types that do not match any data object type defined in the ontology and/or the edges may represent relationship types that do not match any link type between one or more data object types defined in the ontology. For example the system may provide, via the user interface, the interactive graphical representation of the first cluster of unmatched classified triples. In various implementations, prior to providing the interactive graphical representation of the first cluster of unmatched classified triples, the system may determine that a number of unmatched classified triples in the first cluster of unmatched classified triples satisfies a threshold number (e.g., 20, 30, 40, 50, 100, or any other numbers). In response to determining that the number of unmatched classified triples in the first cluster of unmatched classified triples satisfies the threshold number, the system may then provide the graphical representation of the first cluster of unmatched classified triples via the user interface. As such, users may not be notified or distracted by unmatched classified triples that include entity types encountered too infrequently (e.g., noise rather than entity types that user are interested in) to warrant update of an ontology.

Additionally and/or optionally, the system may further provide, via the user interface, a first user interface element for adjusting the threshold number for filtering out a cluster of unmatched classified triples that occur less. Based on a selection (e.g., drag or move to increase the threshold number) of the first user interface element, the system may adjust the threshold number and determine that the number of unmatched classified triples in the first cluster of unmatched classified triples does not satisfy the threshold number. In response to determining that the number of unmatched classified triples in the first cluster of unmatched classified triples does not satisfy the threshold number, the system may filter out the graphical representation of the first cluster of unmatched classified triples from the user interface. As such, users may not view the graphical representation of the first cluster of unmatched classified triples via the user interface but may still view any other cluster of unmatched classified triples that has a number of unmatched classified triples satisfying the adjusted threshold number.

In addition to providing the interactive graphical representation of the first cluster of unmatched classified triples that includes the first node representing a first entity type undefined in an ontology and the second node representing a second entity type undefined in an ontology, the system may further provide a third node that represents a third entity type that is undefined in the ontology. Based on a second user operation made (e.g., moving the third node toward the second node and/or grouping the second node and the third node) via the interactive graphical representation of the user interface, the system may associate the third node with the second node and update the ontology to include a second data object type corresponding to the second entity type represented by the second node, and a first property of the second data object type based on the third entity type represented by the third node. As such, the system may provide users the flexibility to update an ontology by making an entity type that does not match any data object type defined in the ontology to a property type of a data object type defined in the ontology in addition to defining the entity type as another data object type in the ontology.

Additionally, based on a third user operation made (e.g., moving the third node away from the second node and/or ungrouping the second node and the third node) after the second user operation via the interactive graphical representation of the user interface, the system may disassociate the third node with the second node and update the ontology to include a second data object type corresponding to the second entity type represented by the second node, and third data object type corresponding to the third entity type represented by the third node. As such, the system may further provide users the flexibility to update an ontology by changing a property type of a data object type to another data object type.

In addition to graph-based visualization, the system may further provide, through a user interface (e.g., a graphical user interface ("GUI") or other types of user interfaces), a list that includes the plurality of unmatched classified triples. In response to receiving a selection of a first unmatched classified triple of the plurality of unmatched classified triples, the system may provide a first user interface element via the user interface to prompt a user to identify one or more issues associated with the first unmatched classified triple. In response to receiving one or more identifications, made via the user interface, that identify one or more issues associated with the first unmatched classified triple, the system may update the ontology based on the one or more identifications or generating training data to train a LLM based at least on the one or more identifications. For examples, the issue associated with the first unmatched classified triple may be identified by a user to indicate that a first entity type of the first unmatched classified triple does not match any data object type defined in an ontology and the ontology needs to be updated to include a first data object type that matches the first entity type of the first unmatched classified triple. Responsive to this identification by the user, the system may update the ontology to include the first data object type corresponding to the first entity type. As another example, the issue associated with the first unmatched classified triple may be identified by a user to indicate that a first entity type of the first unmatched classified triple is misclassified or inadequately extracted from text data. Responsive to this identification by the user, rather than updating the ontology, the system may generate training data and optionally train a LLM and/or updating a prompt to the LLM using the training data, where the LLM was tasked to classify a data triple to the first unmatched classified triple or extract the data triple from the text data.

Example Features Related to Entities, Data Objects and Ontology

The system may employ database(s) that uses an ontology and data objects to store, represent and/or organize data utilized by the system. The system may update an ontology to include new data object types or add data objects into one or more databases associated with the ontology to enrich the ontology, databases and/or knowledge bases of an organization. As such, data utilized by the system may be organized and linked to relevant context for providing a comprehensive knowledge base for auditing, reference, and analysis.

In various implementations, a body of data may be conceptually structured according to an object-centric data model represented by the ontology. The ontology may include stored information providing a data model for storage of data in the database. The ontology may be defined by one or more data object types, which may each be associated with one or more property types. At the highest level of abstraction, a data object of a data object type may be a container for information representing things in the world. For example, a data object can represent a document or other unstructured data source such as an e-mail message, a news report, or a written paper or article. Additionally, a data object can represent an entity such as a person, a place, an organization, a market instrument, or other noun. Data objects can further represent an event that happens at a point in time or for a duration. Each data object may be associated with a unique identifier that uniquely identifies the data object within the database of the system.

In various implementations, the system may utilize an automated ontology pipeline to extract entities and/or relationships between entities from text data, generate entity types and/or relationship types, generate data objects representing the entities and/or links representing the relationships between entities, or update an ontology to include data object types corresponding to the entity types and/or link types corresponding to the relationship types.

Example Large Language Model-Related Functionality

The system may employ one or more LLMs to provide various services. For example, the system may utilize one or more LLMs to extract data triples from text data, classify data triples to classified triples, vectorize and/or normalize classified triples, or the like. In various implementations, the LLMs utilized by the system may be locally hosted, cloud managed, accessed via one or more Application Programming Interfaces ("APIs"), and/or any combination of the foregoing and/or the like. Data that may be processed and/or extracted using the LLMs may include any type of electronic data, such as text, files, documents, books, manuals, emails, images, audio, video, databases, web pages, time series data, and/or any combination of the foregoing and/or the like.

Additionally, the system may provide the flexibility of easily swapping between various language models employed by the system to provide various services. For example, the system may swap the LLM (e.g., switching between GPT-2 to GPT-3) for generating data triples or classifying classified triples. Such model swapping flexibility provided by the system may be beneficial in various aspects, such as experimentation and adaptation to different models based on specific use cases or requirements, providing versatility and scalability associated with services rendered by the system.

In other implementations, the system can incorporate and/or communicate with one or more LLMs to perform various functions, such as normalizing, vectorizing, executing similarity search on data with reference to an ontology. The communication between the system and the one or more LLMs may include, for example, a context associated with an aspect or analysis being performed by the system, a user-generated prompt, an engineered prompt, prompt and response examples, example or actual data, and/or the like. For example, the system may employ an LLM, via providing a prompt (e.g., a prompt that includes text data) to, and receiving an output (e.g., data triples extracted from the text data) from, the LLM. The output from the LLM may be parsed and/or a format of the output may be updated to be usable for various aspects of the system.

Further Example Information Related to Various Implementations

To facilitate an understanding of the systems and methods discussed herein, several terms are described below and herein. These terms, as well as other terms used herein, should be construed to include the provided descriptions, the ordinary and customary meanings of the terms, and/or any other implied meaning for the respective terms, wherein such construction is consistent with context of the term. Thus, the descriptions below and herein do not limit the meaning of these terms, but only provide example descriptions.

The term "model," as used in the present disclosure, can include any computer-based models of any type and of any level of complexity, such as any type of sequential, functional, or concurrent model. Models can further include various types of computational models, such as, for example, artificial neural networks ("NN"), language models (e.g., large language models ("LLMs")), artificial intelligence ("AI") models, machine learning ("ML") models, multimodal models (e.g., models or combinations of models that can accept inputs of multiple modalities, such as images and text), and/or the like. A "nondeterministic model" as used in the present disclosure, is any model in which the output of the model is not determined solely based on an input to the model. Examples of nondeterministic models include language models such as LLMs, ML models, and the like.

A Language Model is any algorithm, rule, model, and/or other programmatic instructions that can predict the probability of a sequence of words. A language model may, given a starting text string (e.g., one or more words), predict the next word in the sequence. A language model may calculate the probability of different word combinations based on the patterns learned during training (based on a set of text data from books, articles, websites, audio files, etc.). A language model may generate many combinations of one or more next words (and/or sentences) that are coherent and contextually relevant. Thus, a language model can be an advanced artificial intelligence algorithm that has been trained to understand, generate, and manipulate language. A language model can be useful for natural language processing, including receiving natural language prompts and providing natural language responses based on the text on which the model is trained. A language model may include an n-gram, exponential, positional, neural network, and/or other type of model.

A Large Language Model ("LLM") is any type of language model that has been trained on a larger data set and has a larger number of training parameters compared to a regular language model. An LLM can understand more intricate patterns and generate text that is more coherent and contextually relevant due to its extensive training. Thus, an LLM may perform well on a wide range of topics and tasks. An LLM may comprise a NN trained using self-supervised learning. An LLM may be of any type, including a Question Answer ("QA") LLM that may be optimized for generating answers from a context, a multimodal LLM/model, and/or the like. An LLM (and/or other models of the present disclosure), may include, for example, attention-based and/or transformer architecture or functionality. LLMs can be useful for natural language processing, including receiving natural language prompts and providing natural language responses based on the text on which the model is trained. LLMs may not be data security- or data permissions-aware, however, because they generally do not retain permissions information associated with the text upon which they are trained. Thus, responses provided by LLMs are typically not limited to any particular permissions-based portion of the model.

While certain aspects and implementations are discussed herein with reference to use of a language model, LLM, and/or AI, those aspects and implementations may be performed by any other language model, LLM, AI model, generative AI model, generative model, ML model, NN, multimodal model, and/or other algorithmic processes. Similarly, while certain aspects and implementations are discussed herein with reference to use of a ML model, language model, or LLM, those aspects and implementations may be performed by any other AI model, generative AI model, generative model, NN, multimodal model, and/or other algorithmic processes.

In various implementations, the LLMs and/or other models (including ML models) of the present disclosure may be locally hosted, cloud managed, accessed via one or more Application Programming Interfaces ("APIs"), and/or any combination of the foregoing and/or the like. Additionally, in various implementations, the LLMs and/or other models (including ML models) of the present disclosure may be implemented in or by electronic hardware such application-specific processors (e.g., application-specific integrated circuits ("ASICs")), programmable processors (e.g., field programmable gate arrays ("FPGAs")), application-specific circuitry, and/or the like. Data that may be queried using the systems and methods of the present disclosure may include any type of electronic data, such as text, files, documents, books, manuals, emails, images, audio, video, databases, metadata, positional data (e.g., geo-coordinates), geospatial data, sensor data, web pages, time series data, and/or any combination of the foregoing and/or the like. In various implementations, such data may comprise model inputs and/or outputs, model training data, modeled data, and/or the like.

Examples of models, language models, and/or LLMs that may be used in various implementations of the present disclosure include, for example, Bidirectional Encoder Representations from Transformers (BERT), LaMDA (Language Model for Dialogue Applications), PaLM (Pathways Language Model), PaLM 2 (Pathways Language Model 2), Generative Pre-trained Transformer 2 (GPT-2), Generative Pre-trained Transformer 3 (GPT-3), Generative Pre-trained Transformer 4 (GPT-4), LLaMA (Large Language Model Meta AI), and BigScience Large Open-science Open-access Multilingual Language Model (BLOOM).

A Prompt (or "Natural Language Prompt" or "Model Input") can be, for example, a term, phrase, question, and/or statement written in a human language (e.g., English, Chinese, Spanish, and/or the like), and/or other text string, that may serve as a starting point for a language model and/or other language processing. A prompt may include only a user input or may be generated based on a user input, such as by a prompt generation module (e.g., of a document search system) that supplements a user input with instructions, examples, and/or information that may improve the effectiveness (e.g., accuracy and/or relevance) of an output from the language model. A prompt may be provided to an LLM which the LLM can use to generate a response (or "model output").

A User Operation (or "User Input") can be any operations performed by one or more users to user interface(s) and/or other user input devices associated with a system (e.g., the data extraction system). User operations can include, for example, select, drag, move, group, or the like, nodes or edges of one or more interactive graphical representations for updating an ontology based on unmatched classified triples represented by the nodes or the edges. User operations can also include, for example, selecting an unmatched triple displayed in a list and identify one or more issues associated with the unmatched triple. User operations (e.g., input a text data to the data extraction system) can also prompt a task to be performed, such as by an LLM, in whole or in part.

An Ontology can include stored information that provides a data model for storage of data in one or more databases and/or other data stores. For example, the stored data may include definitions for data object types and respective associated property types. An ontology may also include respective link types/definitions associated with data object types, which may include indications of how data object types may be related to one another. An ontology may also include respective actions associated with data object types or data object instances. The actions may include defined changes to values of properties based on various inputs. An ontology may also include respective functions, or indications of associated functions, associated with data object types, which functions may be executed when a data object of the associated type is accessed. An ontology may constitute a way to represent things in the world. An ontology may be used by an organization to model a view on what objects exist in the world, what their properties are, and how they are related to each other. An ontology may be user-defined, computer-defined, or some combination of the two. An ontology may include hierarchical relationships among data object types. An ontology may be used by an organization to model a view of, or provide a template for, what objects exist in the world, what their properties are, and how they are related to each other.

A Data Object (or "Object" or "Data Object Instance") is a data container for information representing a specific thing in the world that has a number of definable properties. For example, a data object can represent an entity such as a person, a place, an organization, a market instrument, or other noun. A data object can represent an event that happens at a point in time or for a duration. A data object can represent a document or other unstructured data source such as an e-mail message, a news report, or a written paper or article. Each data object may be associated with a unique identifier that uniquely identifies the data object. The object's attributes (also referred to as "contents") may be represented in one or more properties. Attributes may include, for example, metadata about an object, such as a geographic location associated with the item, a value associated with the item, a probability associated with the item, an event associated with the item, and so forth. A data object may be of a data object type, where the data object is stored in a database that is associated with an ontology that defines the data object type.

A Data Object Type (or "Object Type") is a type of a data object (e.g., person, event, document, and/or the like). Data object types may be defined by an ontology and may be modified or updated to include additional object types. A data object definition (e.g., in an ontology) may include how the data object is related to other data objects, such as being a sub-data object type of another data object type (e.g., an agent may be a sub-data object type of a person data object type), and the properties the data object type may have.

An Entity is or can refer to a specific person, institution, organization, place, market instrument, event, date, or other noun. Entities can be found in text data such as documents, emails, articles, news reports, written papers, any natural language texts, or the like. Entities can also be found in data triples that are extracted from text data. For example, a data triple may include a person entity (e.g., Mary), a place entity (e.g., country A), and a relationship (e.g., dwells) between the person entity and the place entity. An entity can be represented by a data object of a data object type, where the data object is stored in a database associated with an ontology that defines the data object type.

An Entity Type is a type of an entity. Entity types may include person entity type, place entity type, event entity type, date entity type, or the like. A plurality of entities can be of an entity type. For example, each of the entities Mary, John, Sam, Lenny, Jim, Alice, and Bob can be of the same entity type (e.g., a person entity type, or simply a "person"). An entity type may match a data object type defined in an ontology or may not match any data object type defined in the ontology.

A Data Store is any computer-readable storage medium and/or device (or collection of data storage mediums and/or devices). Examples of data stores include, but are not limited to, optical disks (e.g., CD-ROM, DVD-ROM, and the like), magnetic disks (e.g., hard disks, floppy disks, and the like), memory circuits (e.g., solid state drives, random-access memory (RAM), and the like), and/or the like. Another example of a data store is a hosted storage environment that includes a collection of physical data storage devices that may be remotely accessible and may be rapidly provisioned as needed (commonly referred to as "cloud" storage). According to various implementations, any data storage, data stores, databases, and/or the like described in the present disclosure may, in various implementations, be replaced by appropriate alternative data storage, data stores, databases, and/or the like.

A Database is any data structure (and/or combinations of multiple data structures) for storing and/or organizing data, including, but not limited to, relational databases (e.g., Oracle databases, PostgreSQL databases, MySQL databases, and the like), non-relational databases (e.g., NoSQL databases, and the like), in-memory databases, spreadsheets, comma separated values (CSV) files, eXtensible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) can be understood as being stored in one or more data stores. Additionally, although the present disclosure may show or describe data as being stored in combined or separate databases, in various implementations such data may be combined and/or separated in any appropriate way into one or more databases, one or more tables of one or more databases, and/or the like. According to various implementations, any database(s) described in the present disclosure may be replaced by appropriate data store(s). Further, data source(s) of the present disclosure may include one or more databases, one or more tables, one or more data sources, and/or the like, for example.

Example System and Related Computing Environment

FIG. 1 illustrates an example computing environment 100 including an example data extraction system 102 in communication with various devices to add data objects into database(s) associated with an ontology or provide UI-based functionality for updating the ontology, according to various implementations of the present disclosure. The example computing environment 100 includes the data extraction system 102, one or more LLMs (e.g., LLM 130a and/or LLM 130b), a network 140, a data source 120, and a user 150 (and/or user computing device). In the example of FIG. 1, the data extraction system 102 comprises various modules, including a user interface module 104, an automated ontology pipeline 110, a database module 108 that includes an ontology 105, database 107 and database 109. In other implementations, the data extraction system 102 may include fewer or additional components.

In the example of FIG. 1, the various devices are in communication via a network 140, which may include any combination of networks, such as one or more local area network (LAN), personal area network (PAN), wide area network (WAN), the Internet, and/or any other communication network. In various implementations, modules of the illustrated components, such as the user interface module 104, the automated ontology pipeline 110, and the database module 108 of the data extraction system 102, may communicate via an internal bus and/or via the network 140.

The user interface module 104 is configured to generate user interface data that may be rendered on a user 150, such as to receive an initial user operation/input, as well as later user operation/input that may be used to initiate further data processing. In various implementations, the functionality discussed with reference to the user interface module 104, and/or any other user interface functionality discussed herein, may be performed by a device or service outside of the data extraction system 102 and/or the user interface module 104 may be outside the data extraction system 102. In various examples, the user 150 may perform various operations through the user interface module 104, such as selecting, dragging, moving, grouping, or the like, nodes or edges of one or more interactive graphical representations presented to the user 150 through the user interface module 104. Example user interfaces are described in greater detail below.

The automated ontology pipeline 110 is configured to update the ontology 105, the database 107, or the database 109 associated with the ontology 105 based on data received from the data source 120 in a manner that is consistent with existing definitions in the ontology 105. The automated ontology pipeline 110 may receive text data from the data source 120 and employ the LLM 130a or the LLM 130b to extract information and identify relationship among entities (e.g., persons, institutions, organizations, places, or other nouns) in the text data for generating data of particular structures, such as data triples (e.g., a data triple may include a person entity, a place entity, and a relationship between the person entity and the place entity), and classify data triples to generate classified triples (e.g., a classified triple may include a person entity type, a place entity type, and a relationship type between a person entity type and a place entity type). The automated ontology pipeline 110 may further employ various data processing techniques (e.g., normalization, vectorization, similarity search) to more accurately search and identify classified triples that partially or fully match one or more data object types defined in the ontology 105.

For example, when the automated ontology pipeline 110 determines that a first entity type in a classified triple matches a first data object type defined in the ontology 105, the automated ontology pipeline 110 may automatically add a first data object of the first data object type into the database 109 associated with the ontology 105, where the first data object may represent a first entity that is classified to the first entity type, the first entity being in a data triple from which the classified triple is generated. But when the automated ontology pipeline 110 determines that an entity type in a classified triple does not match any data object type defined in the ontology 105, the automated ontology pipeline 110 may automatically store the classified triple into the database 107 that stores a plurality of unmatched classified data triples, and provide an interactive graphical representation of at least a portion of the plurality of unmatched classified data triples. The interactive graphical representation may include a graph-based visualization including a plurality of nodes and a plurality of edges, where the nodes may represent entity types that do not match any data object type defined in the ontology 105 and/or the edges may represent relationship types that do not match any link type between one or more data object types defined in the ontology 105. By performing various operations (e.g., select, drag, move, group, or the like) on the nodes or edges of the interactive graphical representation, users may more easily update the ontology 105 to define new object types or link types for enriching knowledge base of an organization in line with objective of the organization. Based on new object types defined in the ontology 105, the automated ontology pipeline 110 may further automatically add new data objects of the new data object types into the database 109 to represent entities of entity types that did not match any data object type defined in the ontology 105 before the update.

The database module 108 may be any types of data stores and can store any data objects of data object types defined by the ontology 105 and unmatched classified triples that are undefined by the ontology 105, which may define data object types and associated properties, and relationships among data object types, properties, and/or the like. The database module 108 is configured to store data/information that may be utilized by the automated ontology pipeline 110 and/or accessed or manipulated by the user 150, as described herein. Data that may be stored in the database module 108 may include any type of electronic data, such as text, files, documents, books, manuals, emails, images, audio, video, databases, metadata, positional data (e.g., geo-coordinates), sensor data, web pages, time series data, and/or any combination of the foregoing and/or the like. The database module 108 may optionally obtain and store at least a portion of text data from the data source 120. The database module may optionally store text data from the data source 120, or data triples and/or classified triples generated by the automated ontology pipeline 110.

Specifically, the database module 108 may store the ontology 105, the database 109, and the database 107. The ontology 105 may constitute a way to represent things in the world. The ontology 105 may be used by an organization to model a view on what objects exist in the world, what their properties are, and how they are related to each other. The ontology 105 may be user-defined, computer-defined, or some combination of the two. The ontology 105 may include hierarchical relationships among data object types. The database 109 may store data objects of data object types that are defined by the ontology 105. For example, when the automated ontology pipeline 110 determines that a first entity type in a classified triple matches a first data object type defined in the ontology 105, the automated ontology pipeline 110 may automatically add a first data object of the first data object type into the database 109, where the first data object may represent a first entity that is classified to the first entity type, the first entity being in a data triple from which the classified triple is generated. The database 107 may store one or more unmatched classified triples, where entity type(s) of each of the one or more unmatched classified triples does not match any data object type defined in the ontology 105 or a relationship type of each of the one or more unmatched classified triples does not match any link type between one or more data object types defined in the ontology 105.

It should be noted that the database 107 and the database 109 may be combined and/or separate databases, where data stored in the database 107 and the database 109 may be combined, separated, and/or distributed in any appropriate way into one or more databases, one or more tables of one or more databases, and/or the like. Further, the database 107 and the database 109 can be stored in one or more data stores that may be any types of data storages or any types of data stores. Although illustrated to be hierarchically within the database module 108 in FIG. 1, the database 107 and/or the database 109 can be outside the database module 108, and/or outside the system 102, according to various implementations of the present disclosure.

The data extraction system 102 may include and/or have access to one or more large language models or other language models (e.g., LLM 130a and LLM 130b), and the LLM may be fine-tuned or trained on appropriate training data (e.g., annotated data showing the LLM misclassified or inadequately extracted unmatched classified triples from text data). After receiving text data from the data source 120, the data extraction system 102 may generate and provide a prompt to a LLM 130a, which may include one or more large language models trained to fulfill a modeling objective, such as extracting data triples from text data, classifying data triples to classified triples, or the like.

As shown in FIG. 1, the data extraction system 102 may be capable of interfacing with multiple LLMs. This can allow for experimentation, hot-swapping and/or adaptation to different models based on specific use cases or requirements, providing versatility and scalability to the system. In various implementations, the data extraction system 102 may interface with a second LLM 130b (or the same first LLM 130a) in order to, for example, generate classified triples based on data triples generated by the first LLM 130a. Although FIG. 1 illustrates that the LLM 130a and the LLM 130b are external to the data extraction system 102, in various implementations the LLM 130a and/or the LLM 130b can be internal to the data extraction system 102. It should be noted that the automated ontology pipeline 110 may employ one of the LLM 130a and the LLM 130b for extracting data triples from text data, classifying data triples to classified triples, or the like, according to various implementations of the present disclosure.

In the example of FIG. 1, the automated ontology pipeline 110 may search and identify classified triples that partially or fully match one or more data object types defined in the ontology 105. In various implementations, when the automated ontology pipeline 110 determines that a first entity type in a classified triple matches a first data object type defined in the ontology 105, the automated ontology pipeline 110 may automatically add a first data object of the first data object type into the database 109 associated with ontology 105, where the first data object may represent a first entity that is classified to the first entity type, the first entity being in a data triple from which the classified triple is generated. When the automated ontology pipeline 110 determines that an entity type in a classified triple does not match any data object type defined in the ontology 105, the automated ontology pipeline 110 may automatically store the classified triple into the database 107 that stores a plurality of unmatched classified data triples, and provide an interactive graphical representation of at least a portion of the plurality of unmatched classified data triples. Responsive to one or more user operations to node(s) and/or edge(s) of the interactive graphical representation, the data extraction system 102 may update the ontology 105 to define new object types and/or link types for enriching knowledge base of an organization in line with objective of the organization. As such, the data extraction system 102 can streamline the process of enriching databases (e.g., enriching the database 109 to include more data objects) or updating the ontology 105 through automation to generate a customized or updated ontology 105 in a short period of time. Additionally, the data extraction system 102 can more reliably or repeatedly update the ontology 105 based on new information by employing the LLM 130a and/or the LLM 130b and data analysis techniques to extract, classify, match and/or process text data (e.g., texts, documents, emails, article, or the like) from the data source 120.

Example System and Related Modules

In various implementations, techniques described herein, including with relation to data objects, triples and/or tabular data, the ontology, and/or the like, can be applied only to public documents or data to ensure that no private information is inappropriately added to the ontology. This may involve, for example, an initial check or filter of the documents or data being processed to ensure that they are not private documents or data. Additionally, in various implementations, the entities extracted or identified can be checked against a list of restricted entity types (e.g., a list of private or personal entity types such as health information or detailed banking information). Thus, for example, if the extracted or identified entities match against a restricted entity type, the method or system can responsively omit adding the extracted or identified entities to the ontology to facilitate the protection of private information. Accordingly, in various implementations, the system can include various privacy preserving functionality, such as filtering, anonymizing, obfuscation, aggregating, and/or the like, in combination with various other aspects and functionality of the system.

Figure 2:
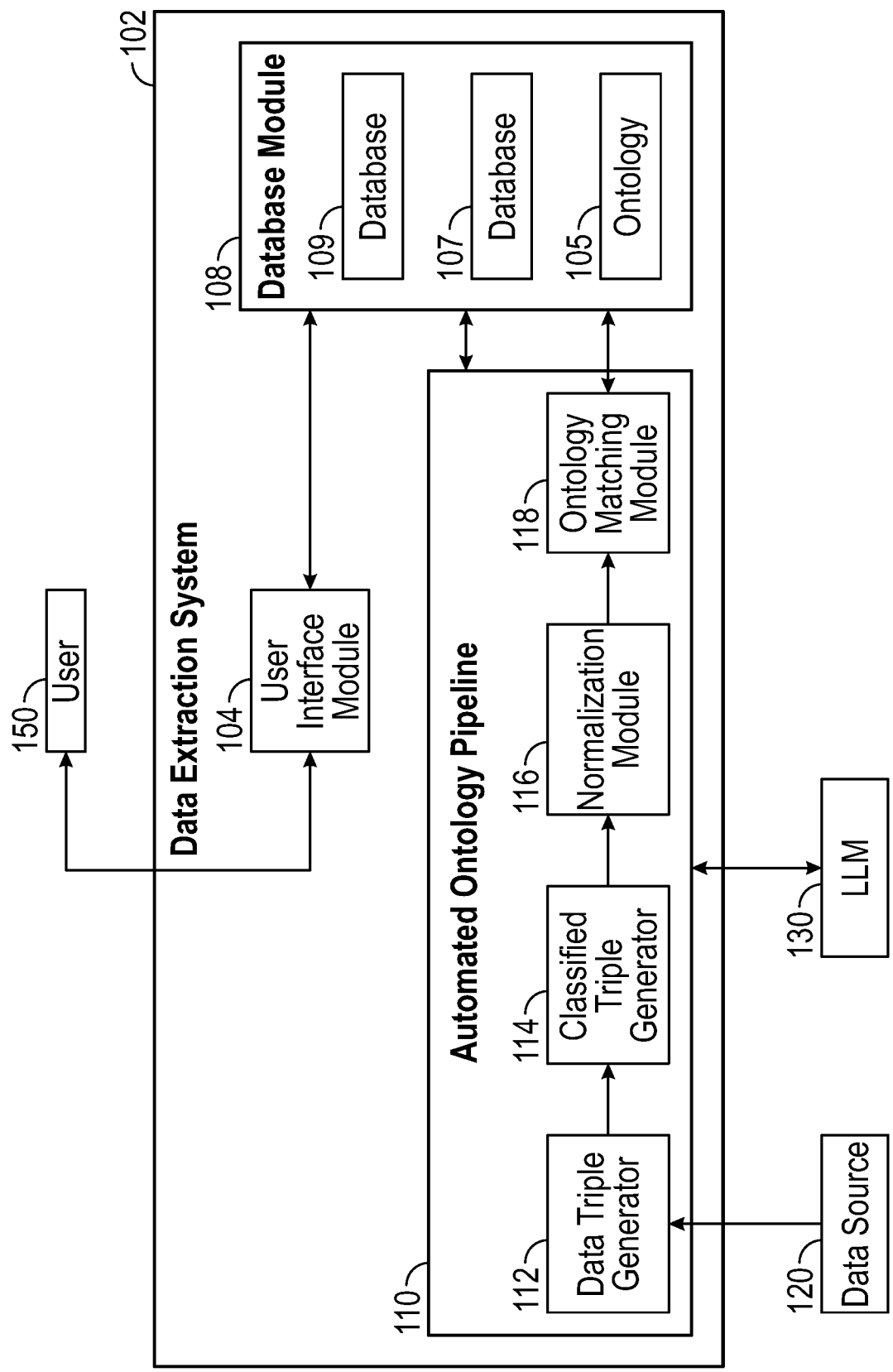
FIG. 2 depicts a block diagram of an example data extraction system, according to various implementations of the present disclosure.

FIG. 2 depicts example connections between various modules of the data extraction system 102 of FIG. 1, including the user interface module 104, the database module 108 that includes the ontology 105, the database 109, and the database 107, and the automated ontology pipeline 110 that includes a data triple generator 112, a classified triple generator 114, a normalization module 116 that can be optional to the automated ontology pipeline 110, and an ontology matching module 118. In other implementations, the data extraction system 102 may include fewer or additional connections. The indicated connections and/or data flows of FIG. 2 are exemplary of only certain processes performed by the data extraction system 102 and is not meant to include all possible blocks and participants. In various implementations, at least some of the modules (e.g., data triple generator 112 and classified triple generator 114) in the data extraction system 102 can be combined or integrated and/or at least some of the modules (e.g., the normalization module 116) can be omitted. Although one LLM (a LLM 130) is illustrated in FIG. 2, it should be noted that the data extraction system 102 can employ more than one LLM to perform data analysis (e.g., generate data triples, generate classified triples, or the like) described herein.

As described above, the user interface module 104 is configured to generate user interface data that may be rendered on the user 150 (which generally refers to a computing device of any type and/or a human user of the device), such as to receive an initial user operation, as well as later user operation that may be used to initiate further data processing. The functionality discussed with reference to the user interface module 104, and/or any other user interface functionality discussed herein, may be performed by a device or service outside of the data extraction system 102 and/or the user interface module 104 may be outside the data extraction system 102. A user 150 may provide a user operation to the user interface module 104 indicating one or more entity types are to be defined into the ontology 105 and/or data analysis to be performed by the data extraction system 102. Alternatively and/or optionally, data analysis (e.g., generate classified triples and generate corresponding data objects if the classified triples match one or more data object types defined in the ontology 105) performed by the data extraction system 102 may not be initiated by user operations from the user 150.

In various implementations, the data triple generator 112 may receive text data from the data source 120, where the text data may be any texts, documents, emails, article, or the like, or any combination thereof. For example, the text data may include one or more natural language words, sentences, paragraphs, or the like. Based on the text data, the data triple generator 112 may generate a first prompt for the LLM 130, where the first prompt may include at least the text data. The data triple generator 112 may then transmit the first prompt to the LLM 130, and receive a first output from the LLM 130 in response to the first prompt, where the first output may include at least a data triple extracted from the text data and the data triple may include a first entity, a second entity, and a relationship between the first entity and the second entity. For example, the text data may include at least a sentence "While studying in XYZ college, Bob was a roommate of Alice" and the data triple in the first output of the LLM 130 may include ["Bob", "roommate", "Alice"]. In this example, the data triple may include the first entity (e.g., "Bob"), the second entity (e.g., "Alice"), and a relationship (e.g., "roommate") between the first entity and the second entity.

Optionally, the first prompt may further include example text data and an example data triple that is extracted from the example text data to provide guidance to the LLM 130 in extracting one or more data triples from text data. For example, in addition to the text data, the first prompt may include example text data "John earned bachelor's degree in 1969" and an example data triple ["John", "earned", "bachelor's degree"] that is extracted from the example text data. Additionally and/or optionally, the user interface module 104 may provide a first graphical representation of the first output from the LLM 130, where the first entity (e.g., "Bob") may be represented as a first node, the second entity (e.g., "Alice") may be represented as a second node, and the relationship (e.g., "roommate") between the first entity and the second entity may be represented as an edge connecting the first node and the second node. As such, users may more easily understand entities and/or relationships within data triples through visualization.

Based on the data triple in the first output from the LLM 130, the automated ontology pipeline 110 may further generate a second prompt for the LLM 130, where the second prompt may include at least the data triple. For example, the classified triple generator 114 may then transmit the second prompt to the LLM 130, and receive a second output from the LLM 130, where the second output may include at least a classified triple and the classified triple may include a first entity type that the first entity is classified to, a second entity type that the second entity is classified to, and a relationship type that the relationship between the first entity and the second entity is classified to. For example, the classified triple may include ["Person", "roommate", "Person"], where "Person" is the first entity type that the first entity (e.g., "Bob") is classified to, "Person" is the second entity type that the second entity (e.g., "Alice") is classified to, and "roommate" is the relationship type that the relationship (e.g., "roommate") is classified to. It should be noted that the LLM 130 can be various types of LLM, such as GPT-2, GPT-3, GPT-3.5, or the like. Alternatively, the automated ontology pipeline 110 may transmit the first prompt and the second prompt to different LLMs, and receive the first output and the second output from different LLMs.

Optionally, the second prompt transmitted by the classified triple generator 114 to the LLM 130 may further include example classification that classifies an example data triple to an example classified triple to provide guidance to the LLM 130 in classifying one or more data triples to one or more classified triples. For example, in addition to the data triple, the second prompt may include an example data triple ["Alice", "works for", "XYZ company"] and an example classified triple ["Person", "works", "Company" ] that is obtained by classifying the example data triple. Additionally and optionally, the second prompt may provide a plurality of data object types defined in the ontology 105 and request that the LLM 130 to classify the data triple into the classified triple using the plurality of data object types. For example, the second prompt from the classified triple generator 114 may provide to the LLM 130 that "Use example entity types listed below if possible: Person, Company, Location, Date, Organization . . . ," where each of the example entity types may match a data object type defined in the ontology 105. Additionally and/or optionally, the user interface module 104 may provide a second graphical representation of the second output from the LLM 130, where the first entity type (e.g., "Person") may be represented as a first node, the second entity (e.g., "Person") may be represented as a second node, and the relationship type (e.g., "roommate") between the first entity type and the second entity type may be represented as an edge connecting the first node and the second node. As such, the user 150 may more easily understand entities and/or relationships within classified triples through visualization.

Using the classified triple, the ontology matching module 118 may execute a similarity search with reference to the ontology 105 to determine whether the classified triple at least partially matches one or more data object types defined in the ontology 105. The ontology matching module 118 may execute the similarity search using one of the cosine similarity search, approximate nearing neighbor (ANN) algorithms, k nearest neighbors (KNN) method, locality sensitive hashing (LSH), range queries, or any other vector clustering and/or similarity search algorithms. In various implementations, the ontology matching module 118 may determine that the classified triple at least partially matches one or more data object types defined in the ontology 105 when the ontology matching module 118 determines that (1) a first entity type of the classified triple matches a first data object type defined in the ontology 105, (2) a second entity type of the classified triple matches a second data object type defined in the ontology 105, and (3) a relationship type of the classified triple matches a link type between the first data object type and the second data object type, where the link type is defined in the ontology 105. In various examples, the ontology matching module 118 may determine that the first entity type matches the first data object type if the first entity type exceeds a threshold similarity with the first data object type.

Additionally and/or optionally, the normalization module 116 may normalize the relationship type of the classified triple prior to the ontology matching module 118 executing the similarity search with reference to the ontology 105. For example, relationship types of "lives" and "lived" may both be normalized to a relationship type "live" that is defined in the ontology 105. Additionally and optionally, the normalization module 116 may vectorize the relationship type of the classified triple to a vector in preparation for the execution of the similarity search. Advantageously, the vectorization and/or normalization of at least a portion of the classified triple may enable the ontology matching module 118 and/or the automated ontology pipeline 110 to more accurately extract, classify, identify, or search information within text data for adding data objects or updating the ontology 105 in consistent with definitions of the ontology 105 and/or objectives of an organization.

In response to determining that the classified triple at least partially matches one or more data object types defined in the ontology 105, the automated ontology pipeline 110 (e.g., the ontology matching module 118) may add into the database 109 a first data object of the first data object type and a second data object of the second data object type, where the first data object represents the first entity (e.g., "Bob") of the data triple and the second data object represents the second entity (e.g., "Alice") of the data triple. Additionally and optionally, the ontology matching module 118 may add into the database 109 a link of the link type that links the first data object and the second data object, where the link represents the relationship (e.g., "roommate") between the first entity and the second entity. Advantageously, the automated ontology pipeline 110 may automatically generate classified triples based on text data and add data objects corresponding to entities and/or relationships described in the text data if the classified triples at least partially match one or more data object types defined in the ontology 105, thereby saving time and labor that otherwise may be required for adding data objects into the database 109.

Alternatively, the ontology matching module 118 may execute a similarity search with reference to the ontology 105 and determine that the classified triple does not partially match one or more data object types defined in the ontology 105. In various implementations, the ontology matching module 118 may determine that the classified triple does not partially match one or more data object types defined in the ontology 105 if the ontology matching module 118 determines that (1) the first entity type (e.g., "Person") of the classified triple or the second entity type (e.g., "Person") of the classified triple does not match any data object type defined in the ontology 105, or (2) the relationship type (e.g., "roommate") does not match any link type between one or more data object types defined in the ontology 105. In response to determining that the classified triple does not partially match one or more data object types defined in the ontology 105, the ontology matching module 118 may optionally store the classified triple into the database 107 that stores a plurality of unmatched classified triples.

Additionally, the user interface module 104 may provide an interactive graphical representation of at least a portion of the plurality of unmatched classified data triples. The interactive graphical representation may include a graph-based visualization including a plurality of nodes and a plurality of edges, where the nodes may represent entity types that do not match any data object type defined in the ontology 105 and/or the edges may represent relationship types that do not match any link type between one or more data object types defined in the ontology 105. By performing various operations (e.g., select, drag, move, group, or the like) on the nodes or edges of the interactive graphical representation, the user 150 may more efficiently update the ontology 105 to define new object types or link types for enriching knowledge base of an organization in line with objective of the organization. Based on new object types defined in the ontology 105, the data extraction system 102 may further automatically add new data objects of the new data object types to represent entities of entity types that did not match any data object type defined in the ontology 105 before the update.

In various implementations, the data extraction system 102 (e.g., the automated ontology pipeline 110) may access the database 107 that stores the plurality of unmatched classified triples. The plurality of unmatched classified triples may include a first subset, where each of the first subset of the plurality of unmatched classified triples may include a first entity type, a second entity type, and a relationship type between the first entity type and the second entity type, and the first entity type or the second entity type does not match any data object type defined in an ontology 105, or the relationship type does not match any link type between one or more data object types defined in the ontology 105.

Based at least on the first entity type, the second entity type, and the relationship type of each of the first subset of the plurality of unmatched classified triples, the data extraction system 102 (e.g., the automated ontology pipeline 110) may cluster each of the first subset of the plurality of unmatched classified triples into a first cluster of unmatched classified triples. The user interface module 104 may further provide an interactive graphical representation of the first cluster of unmatched classified triples, where the interactive graphical representation includes at least a first node representing the first entity type, a second node representing the second entity type, and a first edge connecting the first node and the second node.

The user interface module 104 may then receive a first user operation, made via the interactive graphical representation, to at least the first node. Based at least in part on receiving the first user operation, the data extraction system 102 (e.g., the user interface module 104 or the automated ontology pipeline 110) may update the ontology 105 to include a first data object type corresponding to the first entity type represented by the first node. In various implementations, the first user operation may indicate that the first entity type represented by the first node is to be defined in the ontology 105 as the first data object type, and the data extraction system 102 may update the ontology 105 by defining the first data object type in the ontology 105. Additionally and/or optionally, based at least in part on updating the ontology 105, the data extraction system 102 may add into the database 109 a first data object of the first data object type, where the first data object may represent a first entity of a data triple from which one of the first subset of the plurality of unmatched classified triples is classified.

In various implementations, the user interface module 104 may provide an interactive graphical representation of at least a portion of the plurality of unmatched classified data triples. The interactive graphical representation may include a graph-based visualization including a plurality of nodes and a plurality of edges, where the nodes may represent entity types that do not match any data object type defined in the ontology 105 and/or the edges may represent relationship types that do not match any link type between one or more data object types defined in the ontology 105. For example, the data extraction system 102 may provide, via the user interface module 104, the interactive graphical representation of the first cluster of unmatched classified triples. Optionally, prior to providing the interactive graphical representation of the first cluster of unmatched classified triples, the data extraction system 102 may determine that a number of unmatched classified triples in the first cluster of unmatched classified triples satisfies a threshold number (e.g., 20, 30, 40, 50, 100, or any other numbers). In response to determining that the number of unmatched classified triples in the first cluster of unmatched classified triples satisfies the threshold number, the data extraction system 102 may then provide the graphical representation of the first cluster of unmatched classified triples via the user interface module 104. As such, the user 150 may not be notified or distracted by unmatched classified triples that include entity types encountered too infrequently (e.g., noise rather than entity types that the user 150 is interested in) to warrant update of the ontology 105.

Additionally and/or optionally, the data extraction system 102 may further provide, via the user interface module 104, a first user interface element for adjusting the threshold number for filtering out a cluster of unmatched classified triples that occur less. Based on a selection (e.g., drag or move to increase the threshold number) of the first user interface element, the data extraction system 102 may adjust the threshold number and determine that the number of unmatched classified triples in the first cluster of unmatched classified triples does not satisfy the threshold number. In response to determining that the number of unmatched classified triples in the first cluster of unmatched classified triples does not satisfy the threshold number, the user interface module 104 may filter out the graphical representation of the first cluster of unmatched classified triples from presenting to the user 150. As such, the user 150 may not view the graphical representation of the first cluster of unmatched classified triples via the user interface module 104 but may still view any other cluster of unmatched classified triples that has a number of unmatched classified triples satisfying the adjusted threshold number.

In addition to providing the interactive graphical representation of the first cluster of unmatched classified triples that includes the first node representing a first entity type undefined in the ontology 105 and the second node representing a second entity type undefined in the ontology 105, the user interface module 104 may further provide a third node that represents a third entity type that is undefined in the ontology 105. Based on a second user operation made (e.g., moving the third node toward the second node and/or grouping the second node and the third node) via the interactive graphical representation provided by the user interface module 104, the data extraction system 102 may associate the third node with the second node and update the ontology 105 to include a second data object type corresponding to the second entity type represented by the second node, and a first property of the second data object type based on the third entity type represented by the third node. As such, the data extraction system 102 may provide the user 150 the flexibility to update the ontology 105 by making an entity type that does not match any data object type defined in the ontology 105 to a property type of a data object type defined in the ontology 105 in addition to defining the entity type as another data object type in the ontology 105.

Additionally, based on a third user operation made (e.g., moving the third node away from the second node and/or ungrouping the second node and the third node) after the second user operation via the interactive graphical representation provided by the user interface module 104, the data extraction system 102 may disassociate the third node with the second node and update the ontology 105 to include a second data object type corresponding to the second entity type represented by the second node, and third data object type corresponding to the third entity type represented by the third node. As such, the data extraction system 102 may further provide the user 150 the flexibility to update the ontology 105 by changing a property type of a data object type to another data object type.

The user interface module 104 may further provide a list that includes the plurality of unmatched classified triples. In response to receiving a selection of a first unmatched classified triple of the plurality of unmatched classified triples, the user interface module 104 may provide a first user interface element to prompt the user 150 to identify one or more issues associated with the first unmatched classified triple. In response to receiving one or more identifications, made through the user interface module 104, that identify one or more issues associated with the first unmatched classified triple, the data extraction system 102 may update the ontology 105 based on the one or more identifications or generating training data to train the LLM 130 based at least on the one or more identifications. For examples, the issue associated with the first unmatched classified triple may be identified by the user 150 to indicate that a first entity type of the first unmatched classified triple does not match any data object type defined in the ontology 105 and the ontology 105 needs to be updated to include a first data object type that matches the first entity type of the first unmatched classified triple. Responsive to this identification by the user 150, the data extraction system 102 (e.g., the user interface module 104 or the automated ontology pipeline 110) may update the ontology 105 to include the first data object type corresponding to the first entity type. As another example, the issue associated with the first unmatched classified triple may be identified by the user 150 to indicate that a first entity type of the first unmatched classified triple is misclassified or inadequately extracted from text data. Responsive to this identification by the user 150, rather than updating the ontology 105, the data extraction system 102 may generate training data and optionally train the LLM 130 and/or updating a prompt to the LLM 130 using the training data, where the LLM 130 was tasked to classify a data triple to the first unmatched classified triple or extract the data triple from the text data.

Example Database and Data Models

Figure 3:
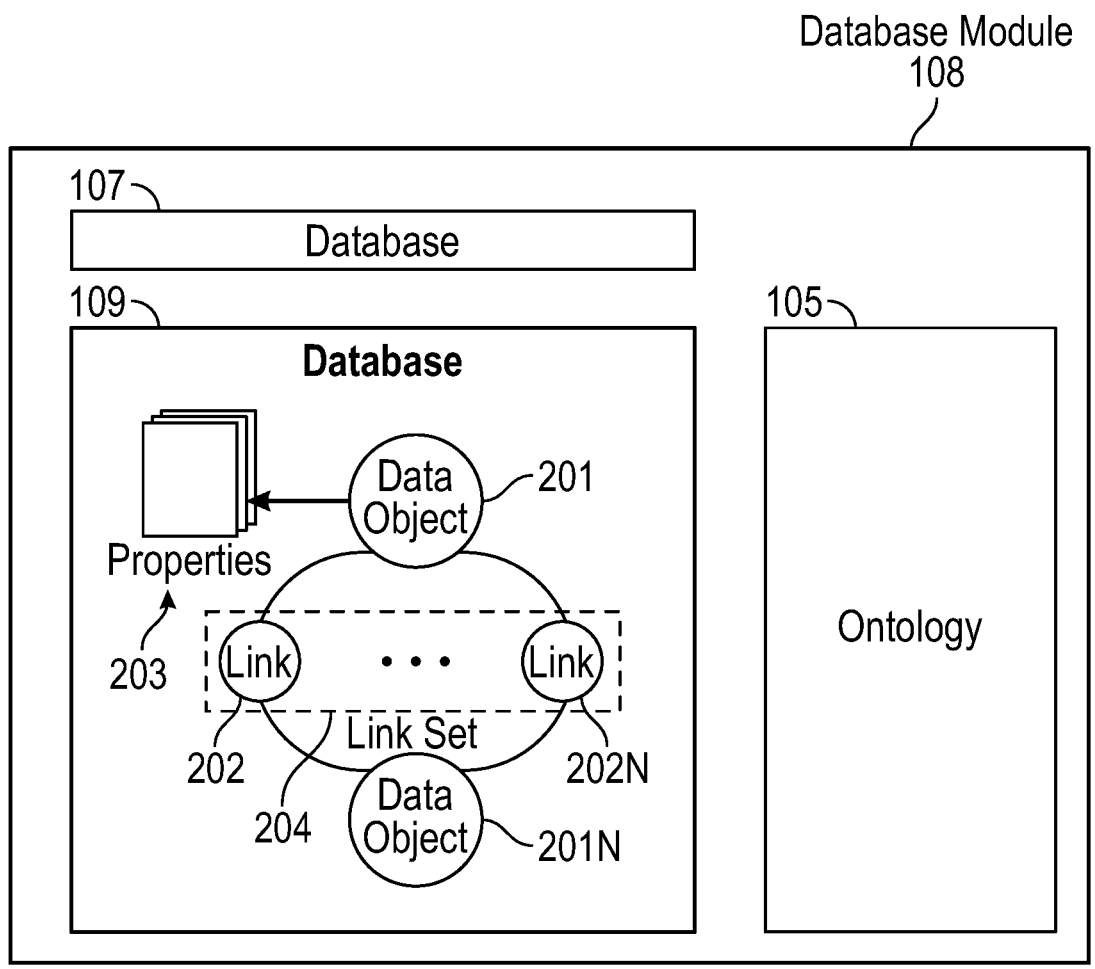
FIG. 3 illustrates an example object-centric conceptual data model, according to various implementations of the present disclosure.

FIG. 3 illustrates an object-centric conceptual data model in the database module 108 of the data extraction system 102 according to various implementations of the present disclosure. The database module 108 may store the ontology 105, the database 109, and the database 107 that stores one or more unmatched classified triples. The ontology 105, as noted above, may include stored information providing a data model for storage of data in the database 109. The ontology 105 may be defined by one or more data object types, which may each be associated with one or more property types. At the highest level of abstraction, data object 201 is a container for information representing things in the world. For example, the data object 201 can represent an entity such as a particular person, place, organization, date, market instrument, item, or other noun, where the entity may appear in text data such as a document, an e-mail message, a news report, a written paper, an article, or the like. Data object 201 can also represent an event that happens at a point in time or for a duration. Each data object 201 may be associated with a unique identifier that uniquely identifies the data object within the database 109 of the database module 108.

In various implementations, different types of data objects may have different property types. For example, a "Person" data object might have an "Eye Color" property type and an "Event" data object might have a "Date" property type. Each property 203 as represented by data in the database module 108 may have a property type defined by the ontology 105 used by the database module 108. Objects may be instantiated in the database 109 in accordance with the corresponding object definition for the particular object in the ontology 105. For example, a specific monetary payment (e.g., an object of type "event") of US$30.00 (e.g., a property of type "currency") taking place on Mar. 27, 2009 (e.g., a property of type "date") may be stored in the database 109 as an event object with associated currency and date properties as defined within the ontology 105. The data objects defined in the ontology 105 may support property multiplicity. In particular, the data object 201 may be allowed to have more than one property 203 of the same property type. For example, a "Person" data object might have multiple "Address" properties or multiple "Name" properties. Each link 202 represents a connection between two data objects 201. In one implementation, the connection is either through a relationship, an event, or through matching properties. A relationship connection may be asymmetrical or symmetrical. For example, "Person" data object A may be connected to "Person" data object B by a "Child Of" relationship (where "Person" data object B has an asymmetric "Parent Of" relationship to "Person" data object A), a "Kin Of" symmetric relationship to "Person" data object C, and an asymmetric "Member Of" relationship to "Organization" data object X. The type of relationship between two data objects may vary depending on the types of the data objects. For example, "Person" data object A may have an "Appears In" relationship with "Document" data object Y or have a "Participate In" relationship with "Event" data object E. As an example of an event connection, two "Person" data objects may be connected by an "Airline Flight" data object representing a particular airline flight if they traveled together on that flight, or by a "Meeting" data object representing a particular meeting if they both attended that meeting. In one implementation, when two data objects are connected by an event, they are also connected by relationships, in which each data object has a specific relationship to the event, such as, for example, an "Appears In" relationship.

As an example of a matching properties connection, two "Person" data objects representing a brother and a sister, may both have an "Address" property that indicates where they live. If the brother and the sister live in the same home, then their "Address" properties likely contain similar, if not identical property values. In one implementation, a link between two data objects may be established based on similar or matching properties (e.g., property types and/or property values) of the data objects. These are just various examples of the types of connections that may be represented by a link and other types of connections may be represented; implementations are not limited to any particular types of connections between data objects. For example, a document might contain references to two different objects. For example, a document may contain a reference to a payment (one object), and a person (a second object). A link between these two objects may represent a connection between these two entities through their co-occurrence within the same document. Each data object 201 can have multiple links with another data object 201 to form a link set 204. For example, two "Person" data objects representing a husband and a wife could be linked through a "Spouse Of" relationship, a matching "Address" property, and one or more matching "Event" properties (e.g., a wedding). Each link 202 as represented by data in the database 109 may have a link type defined by the ontology 105 and/or used by the database 109.

Figure 4:
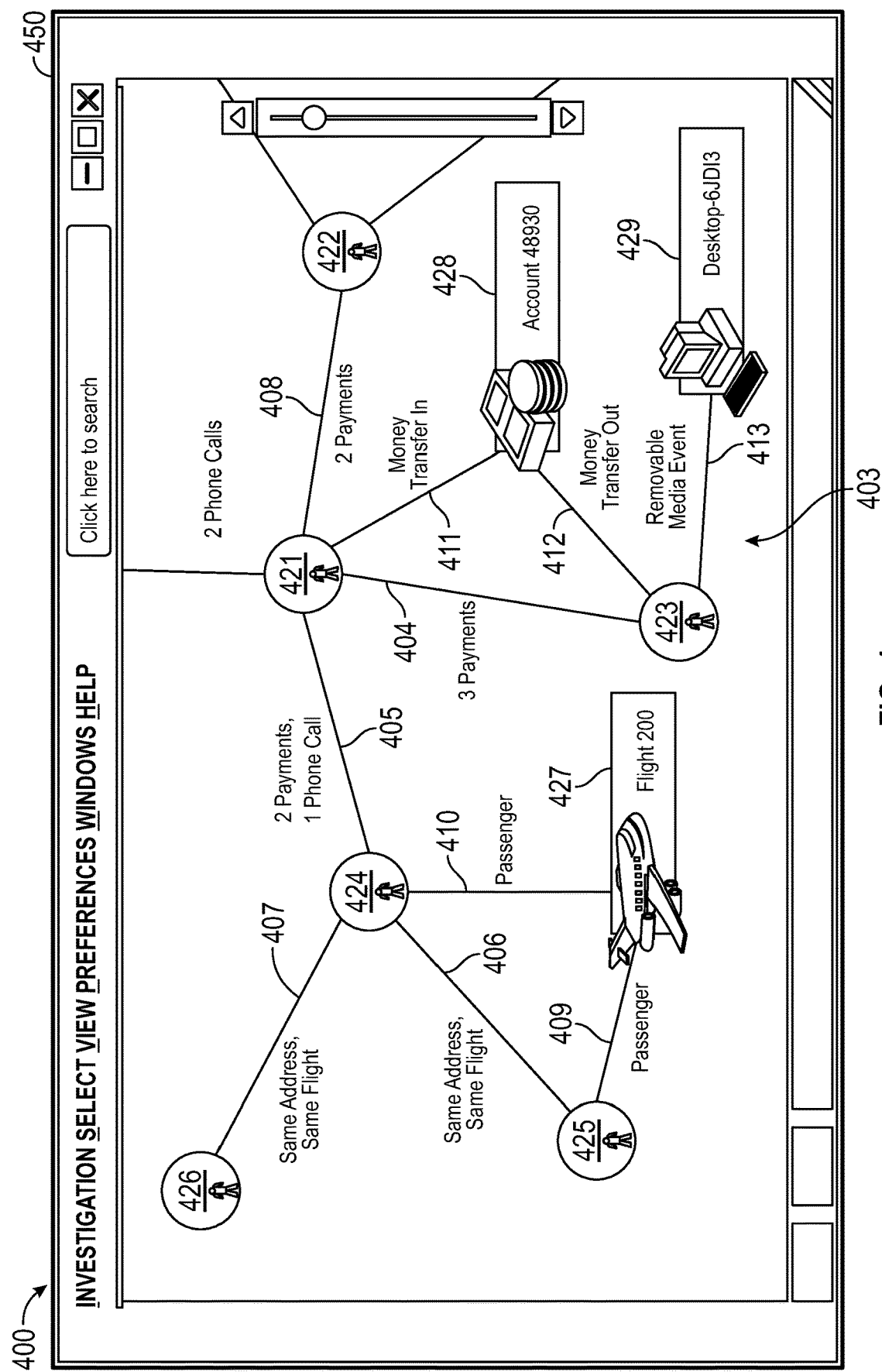
FIG. 4 illustrates an example graphical representation of data objects and links in the object-centric conceptual data model, according to various implementations of the present disclosure.

For ease of understanding, data objects (e.g., the data object 201 and the data object 201N), links between data objects (e.g., the link 202 and link 202N) that may represent relationships between the data objects, and properties of data objects (e.g., the properties 203) can be visualized using one or more graphical user interfaces (GUI). For example, FIG. 4 displays an example user interface 400 showing a graphical representation 403 of relationships (including relationships and/or links 404, 405, 406, 407, 408, 409, 410, 411, 412, and 413) between the data objects (including data objects 421, 422, 423, 424, 425, 426, 427, 428, and 429) that are represented as nodes in the example of FIG. 4. In this implementation, the data objects include person data objects 421, 422, 423, 424, 425, and 426; a flight data object 427; an account 428; and a computer data object 429. In this example, each person node (associated with person data objects), flight node (associated with flight data objects), account node (associated with account data objects), and computer node (associated with computer data objects) may have relationships and/or links with any of the other nodes through, for example, other objects such as payment data objects. For example, in FIG. 4, relationship 404 is based on a payment associated with the individuals indicated in person data objects 421 and 423. The link 404 represents these shared payments (for example, the individual associated with data object 421 may have paid the individual associated with data object 423 on three occasions). The relationship is further indicated by the common relationship between person data objects 421 and 423 and account data object 428. For example, link 411 indicates that person data object 421 transferred money into account data object 428, while person data object 423 transferred money out of account data object 428. In another example, the relationships between person data objects 424 and 425 and flight data object 427 are indicated by links 406, 409, and 410. In this example, person data objects 424 and 425 have a common address and were passengers on the same flight data object 427. In an implementation, further details related to the relationships between the various objects may be displayed. For example, links 411 and 412 may, in some implementations, indicate the timing of the respective money transfers. In another example, the time of the flight associated with the flight data object 427 may be shown.

Relationships between data objects may be stored as links, or in some implementations, as properties, where a relationship may be detected between the properties. In some cases, as stated above, the links may be directional. For example, a payment link may have a direction associated with the payment, where one person object is a receiver of a payment, and another person object is the payer of payment.

In addition to visually showing relationships between the data objects, the user interface may allow various other manipulations. For example, the objects within database module 108 may be searched using a search interface 450 (e.g., text string matching of object properties), inspected (e.g., properties and associated data viewed), filtered (e.g., narrowing the universe of objects into sets and subsets by properties or relationships), and statistically aggregated (e.g., numerically summarized based on summarization criteria), among other operations and visualizations.

Example Functionality and Operations of the System

FIGS. 5, 6, 7, 8 and 9 show flowcharts illustrating example operations of the data extraction system 102 (and/or various other aspects of the example computing environment 100), according to various implementations. The blocks of the flowcharts illustrate example implementations, and in various other implementations various blocks may be rearranged, optional, and/or omitted, and/or additional block may be added. In various implementations, the example operations of the system illustrated in FIGS. 5, 6, 7, 8 and 9 may be implemented, for example, by the one or more aspects of the data extraction system 102 (e.g., the automated ontology pipeline 110), various other aspects of the example computing environment 100, and/or the like.

Figure 5:
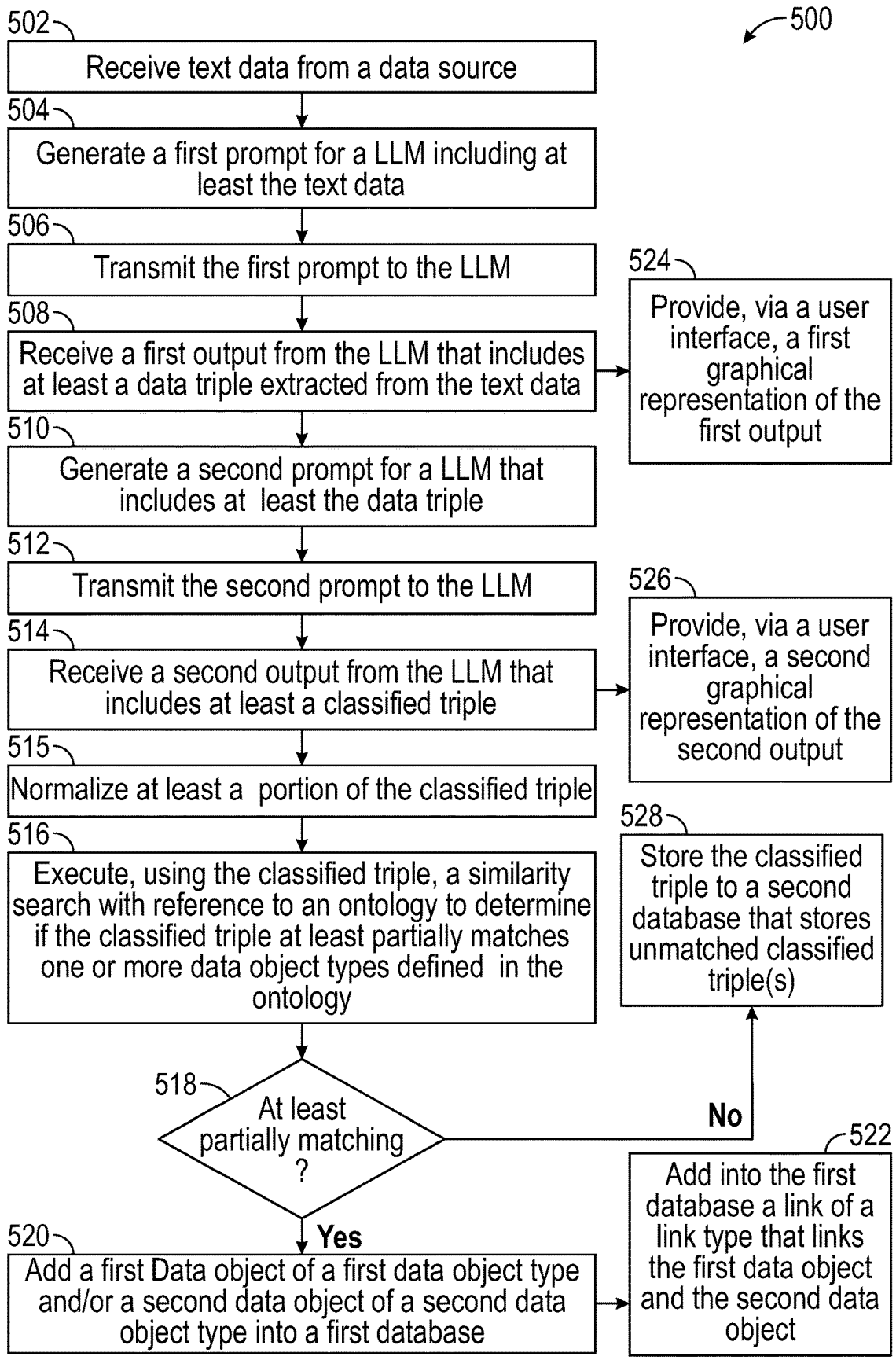
FIG. 5 is a flowchart depicting an example routine for utilizing one or more LLMs to generate classified triples and generate corresponding data objects if the data triples match an ontology, according to various implementations of the present disclosure.

FIG. 5 depicts a flowchart illustrating an example method 500 according to various implementations. The method 500 may be implemented, for example, by the data extraction system 102 of FIGS. 1 and 2 to generate classified triples and generate corresponding data objects if the classified triples match the ontology 105.

At block 502, the data extraction system 102 may receive text data from a data source. For example, the data triple generator 112 may receive text data from the data source 120. The text data may include one or more natural language words, sentences, paragraphs, or the like. An example text data that is received by the data extraction system 102 may be the text data 1002, which will be described in greater detail in FIGS. 10A-10D.

At block 504, the data extraction system 102 may generate a first prompt for a LLM. More specifically, the data triple generator 112 may generate a first prompt for the LLM 130, where the first prompt may include at least the text data received from the data source 120. For example, the first prompt may include the text data 1002 of FIG. 10A. As noted above, the first prompt may further include example text data and an example data triple that is extracted from the example text data to provide guidance to the LLM 130 in extracting one or more data triples from text data. For example, in addition to the text data, the first prompt may include example text data "John earned bachelor's degree in 1969" and an example data triple ["John", "earned", "bachelor's degree"] that is extracted from the example text data. The first prompt may further include instructions to the LLM to perform a particular task, e.g., to generate data triples according to the example(s).

At block 506, the data extraction system 102 may transmit the first prompt to the LLM. For example, the data triple generator 112 may transmit the first prompt to the LLM 130.

At block 508, the data extraction system 102 may receive a first output from the LLM 130 that includes at least a data triple extracted from the text data. For example, the data triple generator 112 may receive the first output from the LLM 130 that includes at least a data triple extracted from the text data. The data triple may include a first entity, a second entity, and a relationship between the first entity and the second entity. For example, in response to receiving the first prompt that includes the text data 1002, the first output from the LLM 130 may include the data triple 1006, the data triple 1008, the data triple 1010, the data triple 1012, and/or the data triple 1014 as illustrated in FIG. 10B.

Optionally, the method 500 may further proceed to block 524, where the data extraction system 102 provides, via the user interface module 104, a first graphical representation of the first output from the LLM 130. For example, the first graphical representation of the first output from the LLM 130 may include a graph-based visualization, with a first node representing the first entity (e.g., "Bob"), a second node representing the second entity (e.g., "Alice"), and an edge representing the relationship (e.g., "roommate") between the first entity and the second entity.

At block 510, the data extraction system 102 may generate a second prompt for a LLM that includes at least the data triple. More specifically, the classified triple generator 114 may generate the second prompt for the LLM 130 that includes at least the data triple. For example, the second prompt for the LLM 130 may include at least the data triples 1006, 1008, 1010, 1012, and/or 1014 as illustrated in FIG. 10B. Optionally, the second prompt may further include example classification that classifies an example data triple to an example classified triple to provide guidance to the LLM 130 in classifying one or more data triples to one or more classified triples. For example, in addition to the data triple, the second prompt may include an example data triple ["Alice", "works for", "XYZ company"] and an example classified triple ["Person", "works", "Company"] that is obtained by classifying the example data triple. Additionally and optionally, the second prompt may provide a plurality of data object types defined in the ontology and request that the LLM 130 to classify the data triple into the classified triple using the plurality of data object types. The second prompt may further include instructions to the LLM to perform a particular task, e.g., to generate classified data triples according to the example(s). For example, the second prompt may provide to the LLM 130 that "Use example entity types listed below if possible: Person, Company, Location, Date, Organization . . . ," where each of the example entity types may match a data object type defined in the ontology.

At block 512, the data extraction system 102 may transmit the second prompt to the LLM. For example, the classified triple generator 114 may transmit the second prompt to the LLM 130.

At block 514, the data extraction system 102 may receive a second output from the LLM that includes at least a classified triple. For example, the classified triple generator 114 may receive a second output from the LLM 130 that includes at least a classified triple. The classified triple may include a first entity type that the first entity of the data triple is classified to, a second entity type that the second entity of the data triple is classified to, and a relationship type that the relationship between the first entity and the second entity is classified to. More specifically, in one example, the second output from the LLM 130 may include the classified triples 1016, 1018 and 1020 as illustrated in FIG. 10C.

Optionally, the method 500 may further proceed to block 526, where the data extraction system 102 provides, via the user interface module 104, a second graphical representation of the second output from the LLM 130. For example, the second graphical representation of the second output from the LLM 130 may include a first node representing the first entity type (e.g., "Person"), a second node representing the second entity type (e.g., "Person"), and an edge representing the relationship type (e.g., "roommate") between the first entity type and the second entity type.

At block 515, the data extraction system 102 may optionally normalize at least a portion of the classified triple. Specifically, the normalization module 116 may optionally normalize a relationship type in the classified triple. For example, relationship types of "lives" and "lived" may both be normalized to a relationship type "live" that is defined in the ontology 105. Additionally and optionally, the data extraction system 102 may vectorize the relationship type of the classified triple to a vector in preparation for the execution of the similarity search. Advantageously, the vectorization and/or normalization of at least a portion of the classified triple may enable the data extraction system 102 to more accurately extract, classify, identify, or search information within text data for adding data objects or updating the ontology 105 in consistent with definitions of the ontology 105 and/or objectives of an organization.

At block 516, the data extraction system 102 (e.g., the ontology matching module 118) may execute, using the classified triple, a similarity search with reference to the ontology 105 to determine if the classified triple at least partially matches one or more data object types defined in the ontology 105.

The method 500 then varies according to whether the data extraction system 102 determines that the classified triple at least partially matches one or more data object types defined in the ontology 105. In the instance that the classified triple at least partially matches one or more data object types defined in the ontology 105, block 518 evaluates as "Yes" and the method 500 proceeds to block 520, where the data extraction system 102 may add a first data object of a first data object type and/or a second data object of a second data object type into the database 109 such that the first data object in the database 109 represents the first entity of the data triple and the second data object in the database 109 represents the second entity of the data triple. The method 500 may further proceed to block 522, where the data extraction system 102 adds into the database 109 a link of a link type defined in the ontology 105 that links the first data object and the second data object. For example, if the ontology matching module 118 determines that the classified triple 1016 illustrated in FIG. 10C at least partially matches one or more data object types defined in the ontology 105 (e.g., the "Person" entity type matches a first data object defined in the ontology 105 and the "education degree" entity type matches a second data object defined in the ontology 105), the data extraction system 102 may then automatically add the data object 201A (e.g., "Bob") and the data object 201B (e.g., "PhD degree") into the database 109 as shown in FIG. 10D.

In the instance that the classified triple does not at least partially match one or more data object types defined in the ontology 105, then block 518 evaluates as "No" and the method 500 proceeds to block 528, where the data extraction system 102 may store the classified triple to the database 107 that stores unmatched classified triple(s), which may then be presented through example user interfaces illustrated in FIGS. 11-14.

Figure 6A:
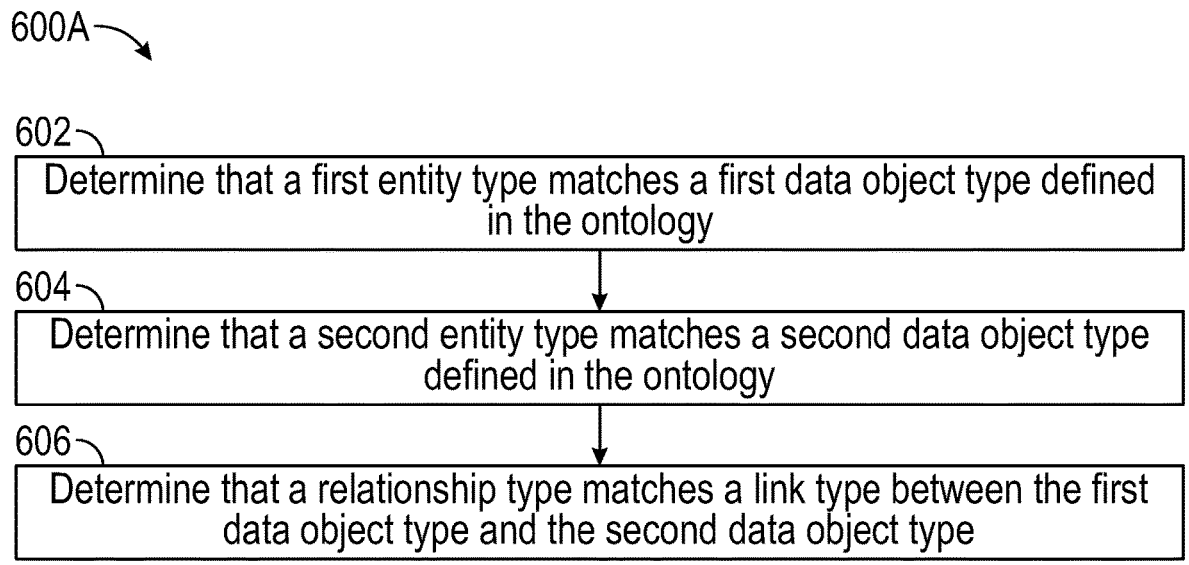
FIG. 6A is a flowchart depicting an example routine for determining that a classified triple at least partially matches one or more data object types defined in an ontology, according to various implementations of the present disclosure.

FIG. 6A is an example flowchart depicting an example method 600A for determining that a classified triple at least partially matches one or more data object types defined in the ontology 105 according to various implementations. In various implementations, the method 600A may be performed in part or in full by the data extraction system 102 of FIGS. 1 and/or 2, such as the ontology matching module 118. It should be noted that for the data extraction system 102 to determine that a classified triple at least partially matches the ontology 105, not all of the blocks 602, 604 and 606 have to be satisfied. For example, the data extraction system 102 may determine that a classified triple at least partially matches the ontology 105 if one of the blocks 602, 604 and 606 is satisfied. Additionally, the blocks 602, 604 and 606 do not have to be satisfied or performed in sequential order.

At block 602, the data extraction system 102 determines that a first entity type of the classified triple matches a first data object type defined in the ontology 105. For example, the data extraction system 102 may determine that the first entity type matches the first data object type if the first entity type exceeds a threshold similarity with the first data object type. For example, the ontology matching module 118 may determine that the "Person" entity type of the classified triple 1016 illustrated in FIG. 10C matches a first data object type defined in the ontology 105.

At block 604, the data extraction system 102 determines that a second entity type of the classified triple matches a second data object type defined in the ontology 105. For example, the data extraction system 102 may determine that the second entity type matches the second data object type if the second entity type exceeds a threshold similarity with the second data object type. For example, the ontology matching module 118 may determine that the "educational degree" entity type of the classified triple 1016 illustrated in FIG. 10C matches a second data object type defined in the ontology 105.

At block 606, the data extraction system 102 determines that a relationship type of the classified triple matches a link type between the first data object type and the second data object type, where the link type is defined in the ontology 105. For example, the ontology matching module 118 may determine that the "earned" relationship type of the classified triple 1016 illustrated in FIG. 10C matches a link type defined in the ontology 105.

Figure 6B:
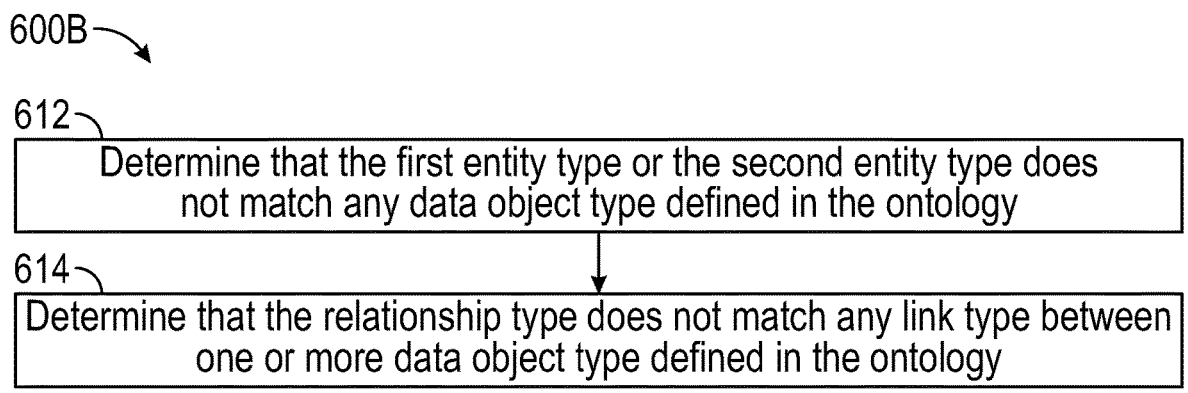
FIG. 6B is a flowchart depicting an example routine for determining that a classified triple does not at least partially match one or more data object types defined in an ontology, according to various implementations of the present disclosure.

FIG. 6B is an example flowchart depicting an example method 600B for determining that a classified triple does not at least partially match one or more data object types defined in the ontology 105 according to various implementations. In various implementations, the method 600B may be performed in part or in full by the data extraction system 102 of FIGS. 1 and/or 2, such as the ontology matching module 118. It should be noted that for the data extraction system 102 to determine that a classified triple does not at least partially match the ontology 105, not all of the blocks 612 and 614 have to be satisfied. For example, the data extraction system 102 may determine that a classified triple does not at least partially match the ontology 105 if one of the blocks 612 and 614 is satisfied. Additionally, the blocks 612 and 614 do not have to be satisfied or performed in sequential order.

At block 612, the data extraction system 102 determines that a first entity type of a classified triple or a second entity type of the classified triple does not match any data object type defined in the ontology 105. For example, the ontology matching module 118 may determine that the "Person" entity type or the "educational degree" entity type of the classified triple 1016 illustrated in FIG. 10C does not match any data object type defined in the ontology 105.

At block 614, the data extraction system 102 determines that a relationship type of the classified triple does not match any link type between one or more data object types defined in the ontology 105. For example, the ontology matching module 118 may determine that the "earned" relationship type of the classified triple 1016 illustrated in FIG. 10C does not match any link type between one or more data object types defined in the ontology 105.

Figure 7:
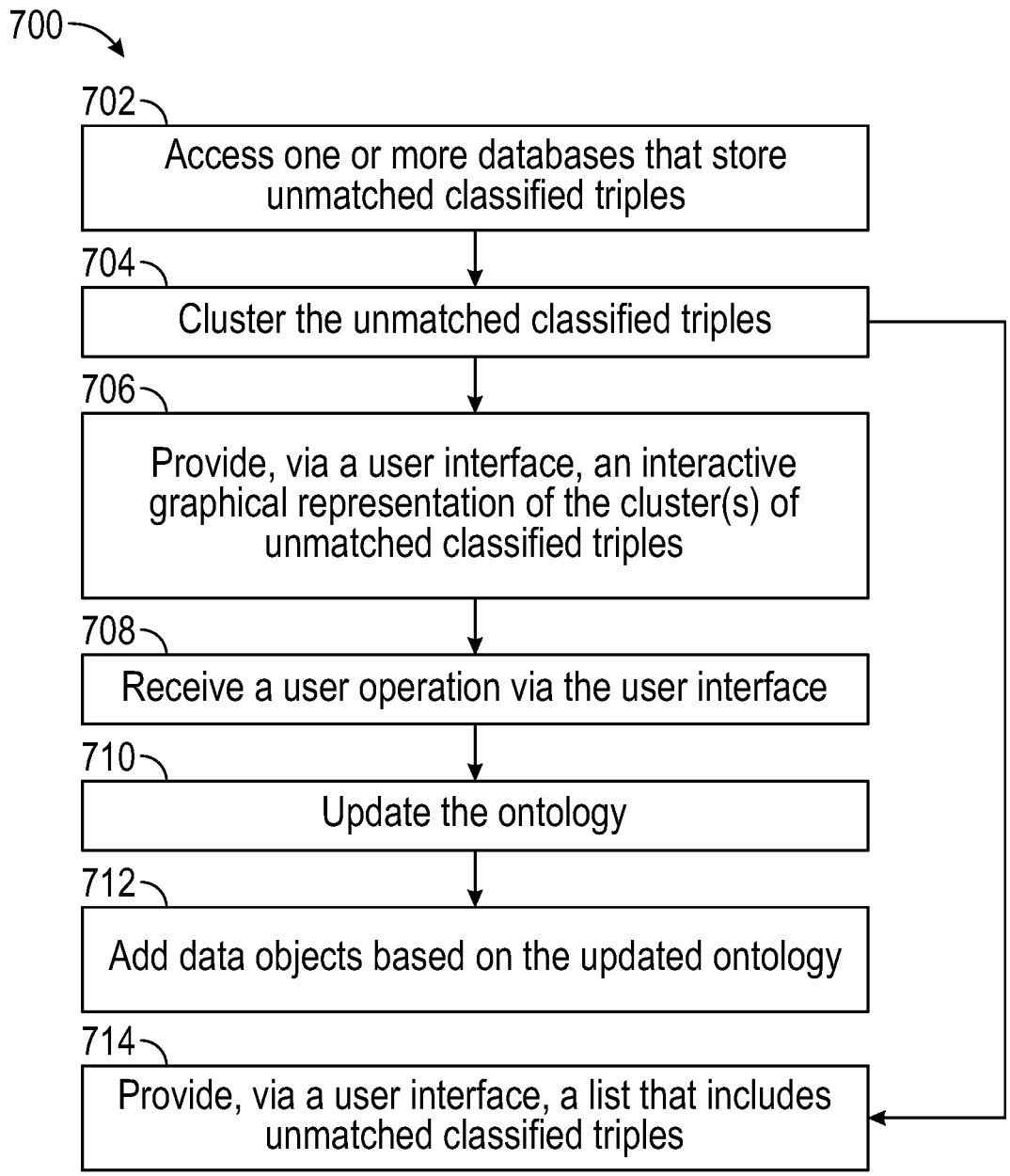
FIG. 7 is a flowchart depicting an example routine for processing unmatched classified triples, updating an ontology accordingly, and then generating data objects based on the updated ontology, according to various implementations of the present disclosure.

FIG. 7 is an example flowchart depicting an example method 700 for processing unmatched classified triples, updating the ontology 105 accordingly, and then generating data objects based on the updated ontology 105, according to various implementations. In various implementations, the method 700 may be performed in part or in full by the data extraction system 102, such as the user interface module 104 and automated ontology pipeline 110. In various implementations, part or all of the method 700 may be performed by the data extraction system 102 after the data extraction system 102 stores one or more classified triples to the database 107 at block 528 of FIG. 5. Alternatively and/or optionally, part or all of the method 700 may be performed by the data extraction system 102 in response to receiving one or more user operations from the user 150.

At block 702, the data extraction system 102 accesses one or more databases that store a plurality of unmatched classified triples. For example, the data extraction system 102 may access the database 107 that stores a plurality of unmatched classified triples. The plurality of unmatched classified triples may include a first subset, where each of the first subset of the plurality of unmatched classified triples includes a first entity type, a second entity type, and a relationship type between the first entity type and the second entity type, and the first entity type or the second entity type does not match any data object type defined in the ontology 105 or the relationship type does not match any link type between one or more data object types defined in the ontology 105.

Figure 11:
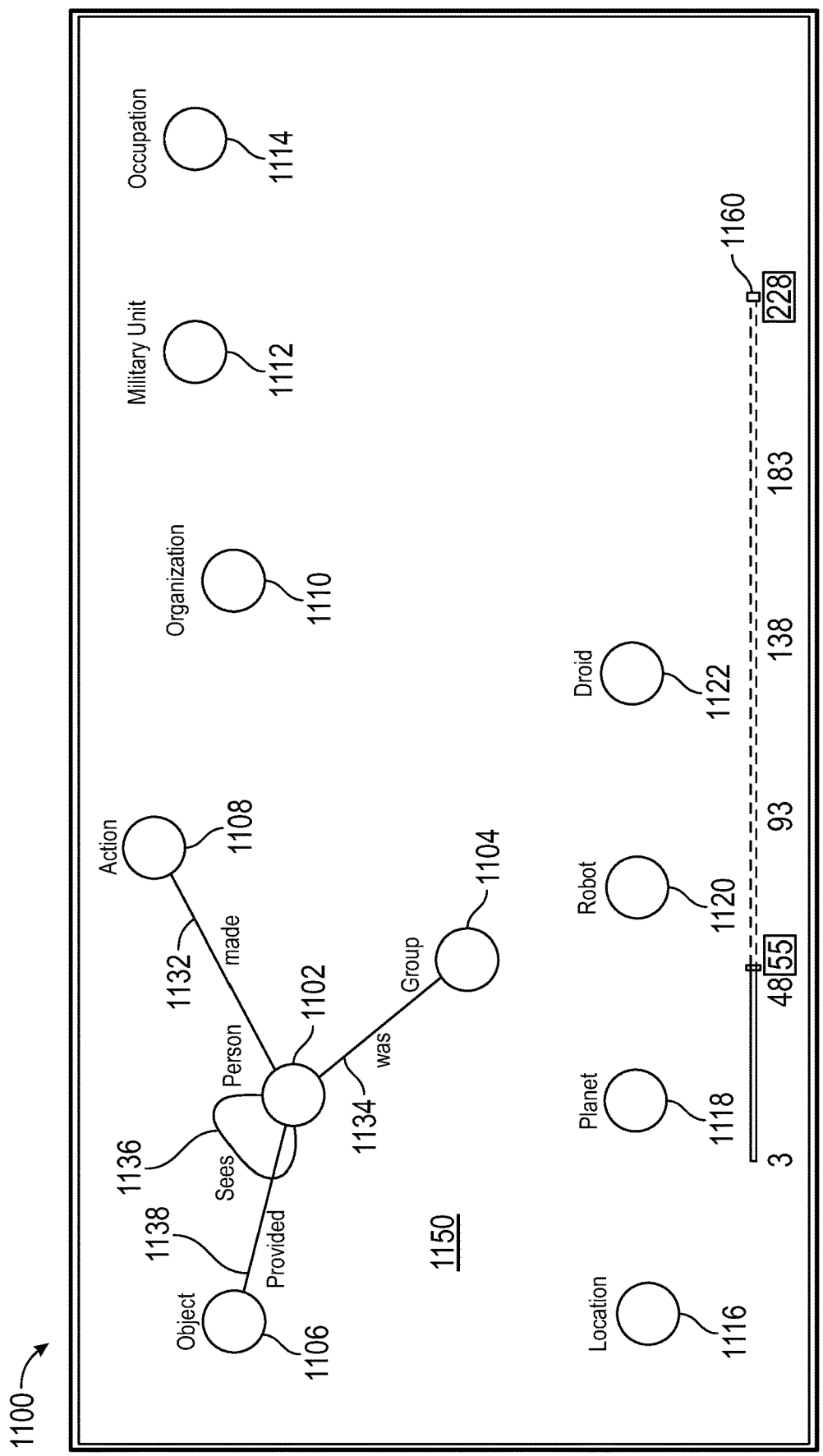
Figure 12:
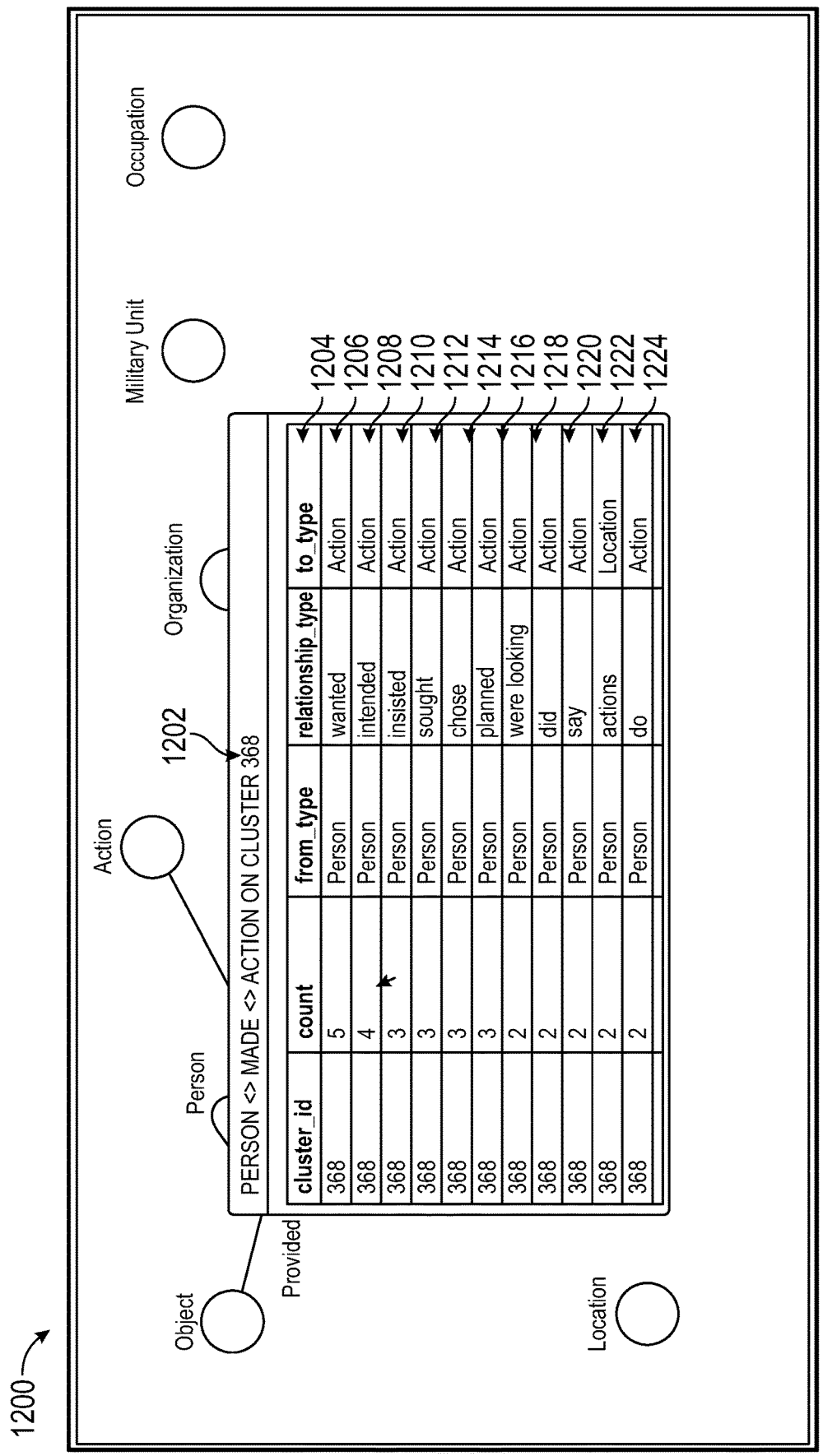

At block 704, the data extraction system 102 may cluster the unmatched classified triples. For example, the data extraction system 102 may cluster, based at least on the first entity type, the second entity type, and the relationship type of each of the first subset of the plurality of unmatched classified triples, each of the first subset of the plurality of unmatched classified triples into a first cluster of classified triples. For example, the first cluster of unmatched classified triples may be the cluster of unmatched classified triples 1202 as illustrated in FIG. 12 that is represented by the node 1102, the node 1108, and the edge 1132 as illustrated in FIG. 11.

The method 700 may optionally further proceed to block 714, where the data extraction system 102 provides, via the user interface module 104, a list that includes unmatched classified triple(s) for the user 150 to view. An example list that includes unmatched classified triple(s) for the user 150 to view is the list 1402 that will be described with greater detail in FIG. 14.

At block 706, the data extraction system 102 may provide, via a user interface, an interactive graphical representation of a cluster of unmatched classified triples. For example, the data extraction system 102 may provide, via a user interface, an interactive graphical representation of the first cluster of unmatched classified triples. For example, the data extraction system 102 may provide, via the user interface module 104, an interactive graphical representation of the first cluster of unmatched classified triples, where the interactive graphical representation includes at least a first node representing the first entity type, a second node representing the second entity type, and a first edge connecting the first node and the second node. More specifically, as illustrated in FIG. 11, the data extraction system 102 may provide, via the user interface 1100, the interactive graphical representation 1150 that include the node 1102, the node 1108 and the edge 1132 to represent the cluster of unmatched classified triples 1202 of FIG. 12.

At block 708, the data extraction system 102 receives user operations, made via the interactive graphical representation that is provided by the user interface module 104 at block 706, to, for example, various of the nodes. The user operations may include selecting, dragging, moving, grouping, or the like, nodes (e.g., the first node and/or the second node) or edges of the interactive graphical representation presented to the user 150 through the user interface module 104.

Figure 13:
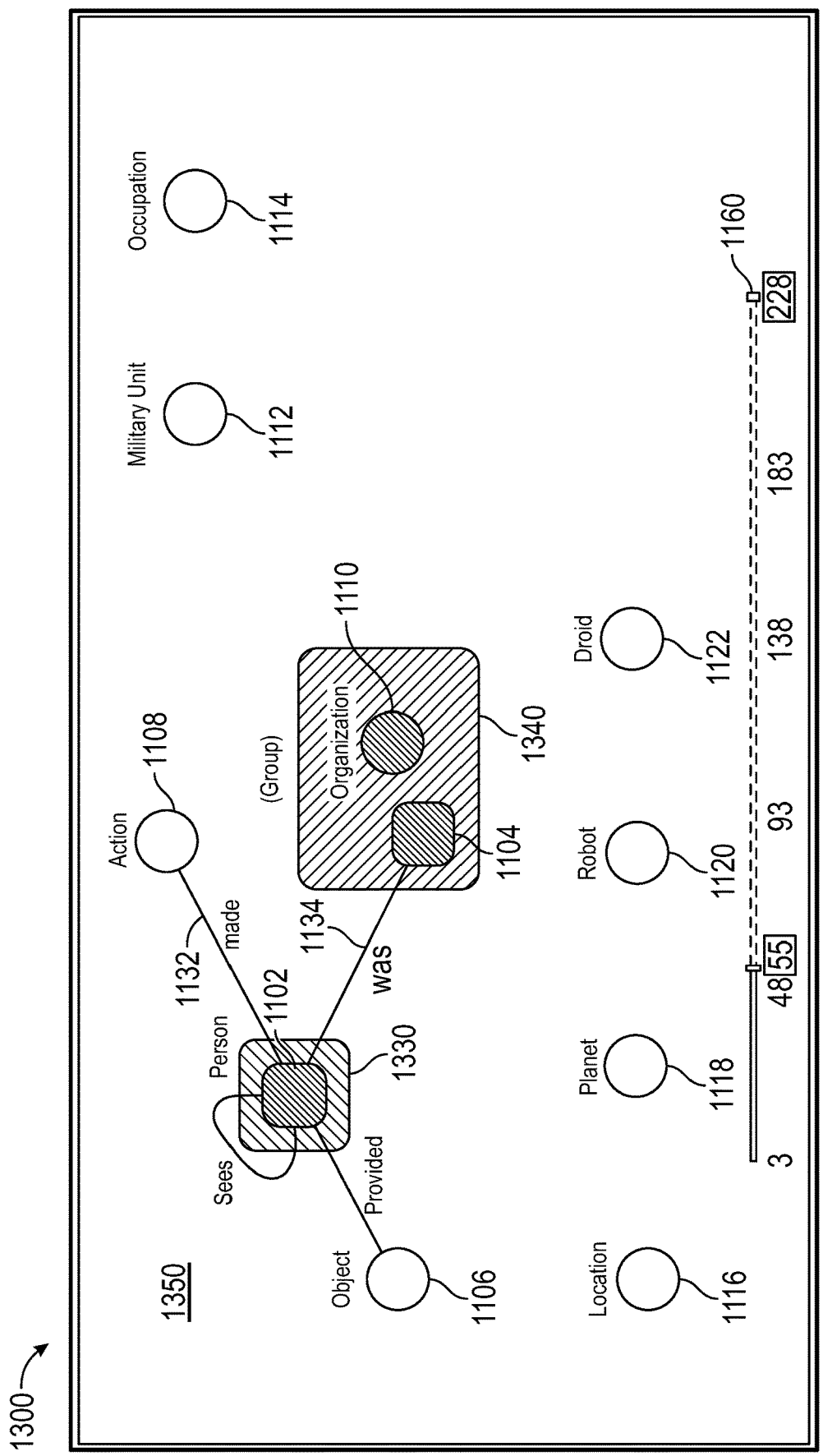

At block 710, the data extraction system 102 may update the ontology 105. For example, the data extraction system 102 may update the ontology 105 to at least include a first data object type corresponding to the first entity type represented by the first node, as defined by a user's operations. Specifically, a first user operation may indicate to the data extraction system 102 that a first entity type represented by a first node is to be defined in the ontology 105 as a first data object type, and the data extraction system 102 may update the ontology 105 to define the first data object type. For example, as illustrated in FIG. 13, the first user operation received at block 708 may enclose the node 1102 using a rectangular-like shape 1330 to indicate that the "Person" entity type represented by the node 1102 is to be defined in the ontology 105 as a first data object type that was previously undefined in the ontology 105. As such, the data extraction system 102 may update the ontology 105 to include a data object type corresponding to the "Person" entity type represented by the node 1102. As another example illustrated in FIG. 13, the first user operation may associate the node 1104 and the node 1110 (e.g., moving the node 1110 toward the node 1104) to indicate (e.g., through enclosing the node 1104 and the node 1110 using a rectangular-like shape 1340 after the node 1110 is moved toward the node 1104) that the "Organization" entity type represented by the node 1110 is to be added as a first property of a second data object type that is to be defined in the ontology 105 and corresponding to the entity type represented by the node 1104. Other types of user operations may be provided, which, for example, may group and/or ungroup various nodes to define various data object types and/or properties associated with the data object types.

Optionally, the method 700 may further proceed to block 712, where the data extraction system 102 adds into the database 109 data objects based on the updated ontology 105. For example, the data extraction system 102 may add a first data object of the first data object type, using the first data object to represent a first entity of the first entity type.

Figure 8:
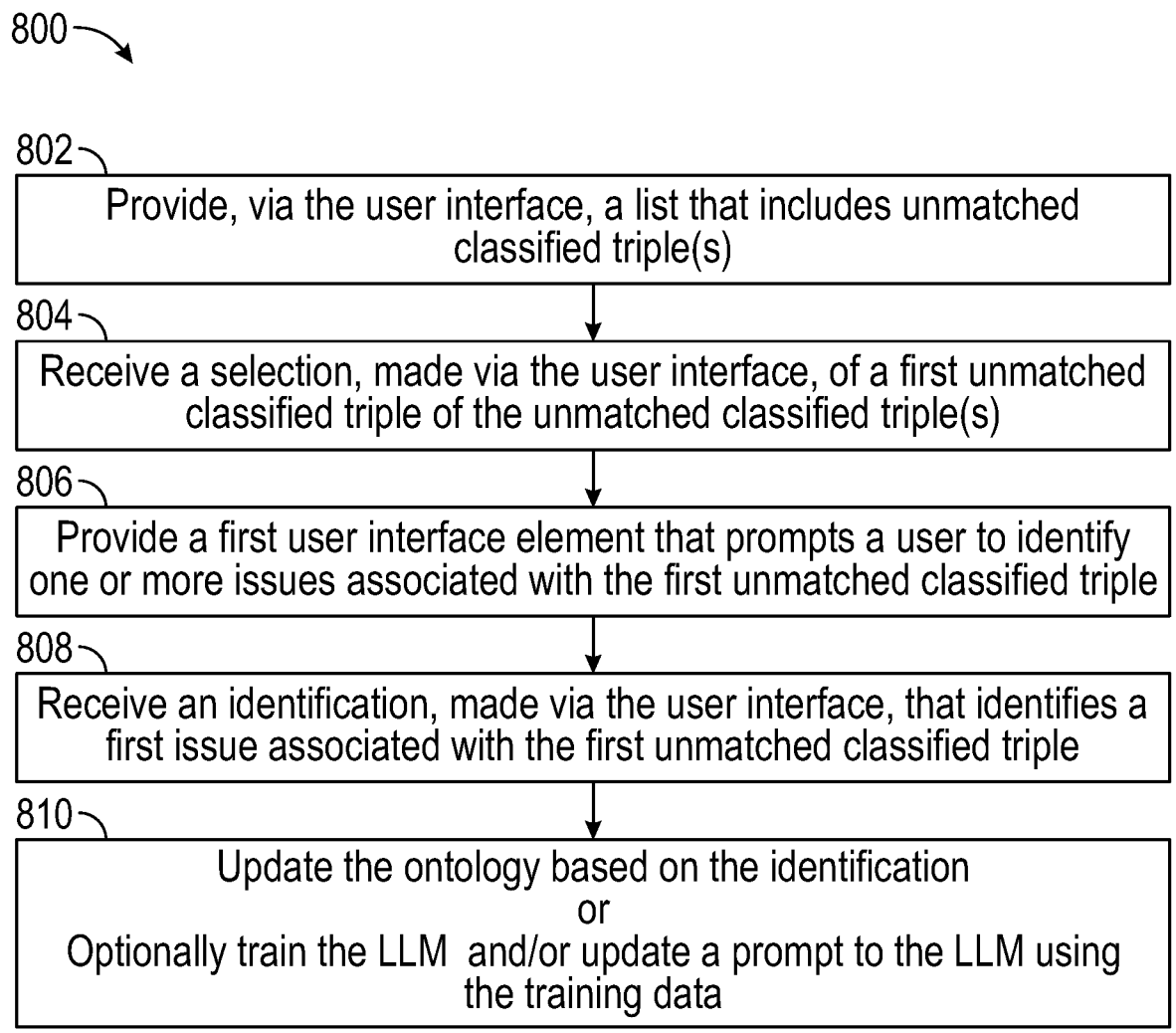
FIG. 8 is a flowchart depicting an example routine for updating an ontology or generating training data for a LLM based on one or more user identifications of issue(s) associated with an unmatched classified triple presented to users through a list, according to various implementations of the present disclosure.

FIG. 8 is an example flowchart depicting an example method 800 for updating the ontology 105 or generating training data for a LLM (e.g., the LLM 130, the LLM 130*a*, and/or the LLM 130*b*) based on one or more user identifications of issue(s) associated with an unmatched classified triple presented to users through a list, according to various implementations. In various implementations, part or all of the method 800 may be performed by the data extraction system 102 after the data extraction system 102 accesses the database 107 that stores unmatched classified triples at block 702 of FIG. 7. In various implementations, part or all of the method 800 may be better understood with reference to the example user interface 1500 of FIG. 15.

At block 802, the data extraction system 102 may provide, via the user interface module 104, a list that includes unmatched classified triple(s), where the unmatched classified triple(s) are stored in the database 107. As noted above, the list that includes unmatched classified triple(s) may be the list 1402 that will be described with greater detail in FIG. 14

Figure 15:
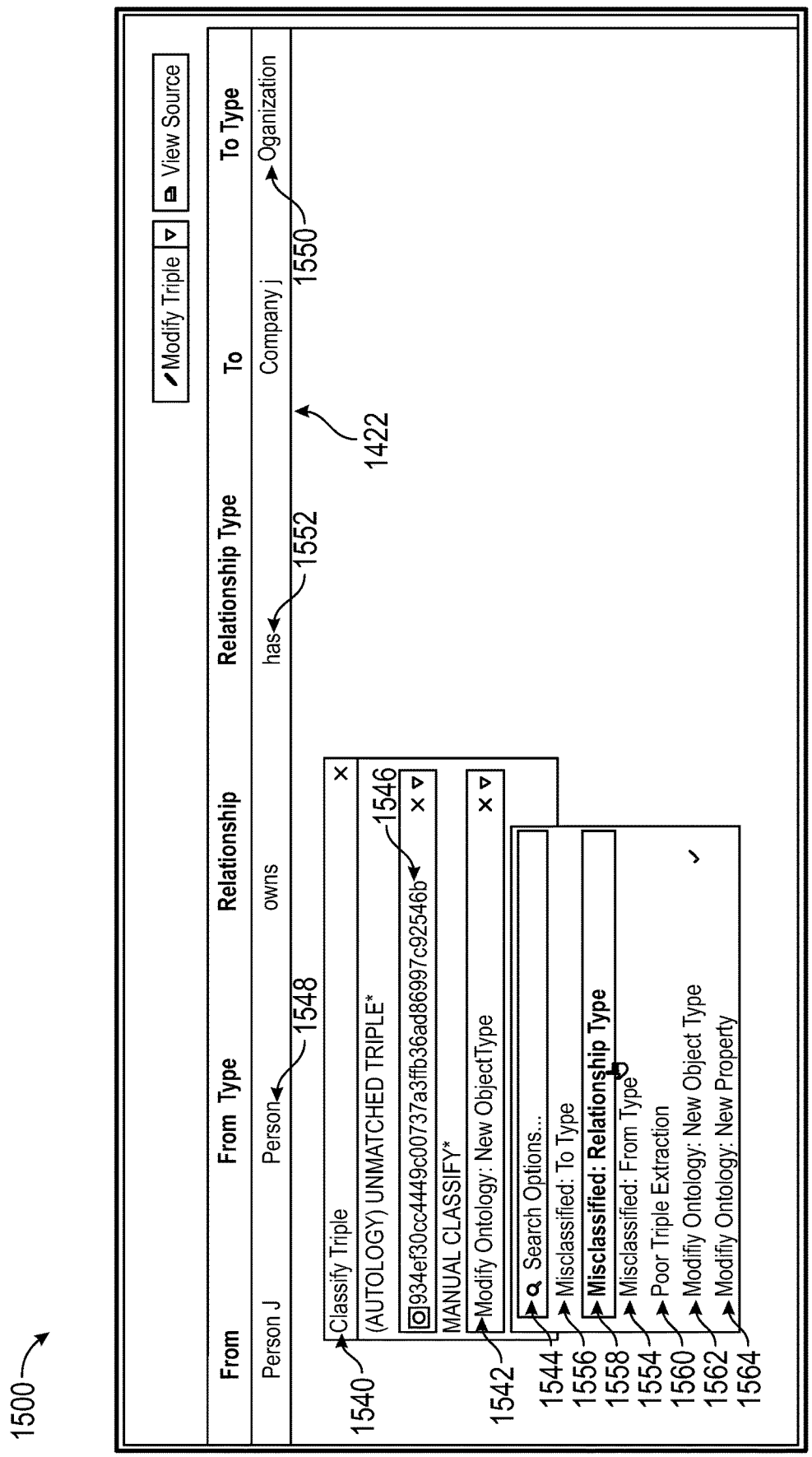

At block 804, the data extraction system 102 may receive a selection from the user 150, made via the user interface module 104, of a first unmatched classified triple of the unmatched classified triple(s). For example, the first unmatched classified triple of the unmatched classified triple(s) that is selected may be the unmatched classified triple 1422 as illustrated in FIG. 15.

At block 806, in response to receiving the selection of the first unmatched classified triple, the data extraction system 102 (e.g., the user interface module 104) may provide a first user interface element that prompts the user 150 to identify one or more issues associated with the first unmatched classified triple. As an example, the first user interface element may be the menu 1542 and/or the search column 1544 as illustrated in FIG. 15.

At block 808, the data extraction system 102 may receive an identification from the user 150, made via the user interface module 104, that identifies one or more issues associated with the first unmatched classified triple. For example, as illustrated in FIG. 15, the identification from the user 150 may indicate, through the display portion 1558, that a relationship type of the first unmatched classified triple is misclassified.

At block 810, in response to receiving the identification, the data extraction system 102 may update the ontology 105 based on the identification and/or generate training data based at least on the identification to train the LLM. Optionally, the data extraction system 102 may train the LLM and/or update a prompt to the LLM using the training data.

Figure 9:
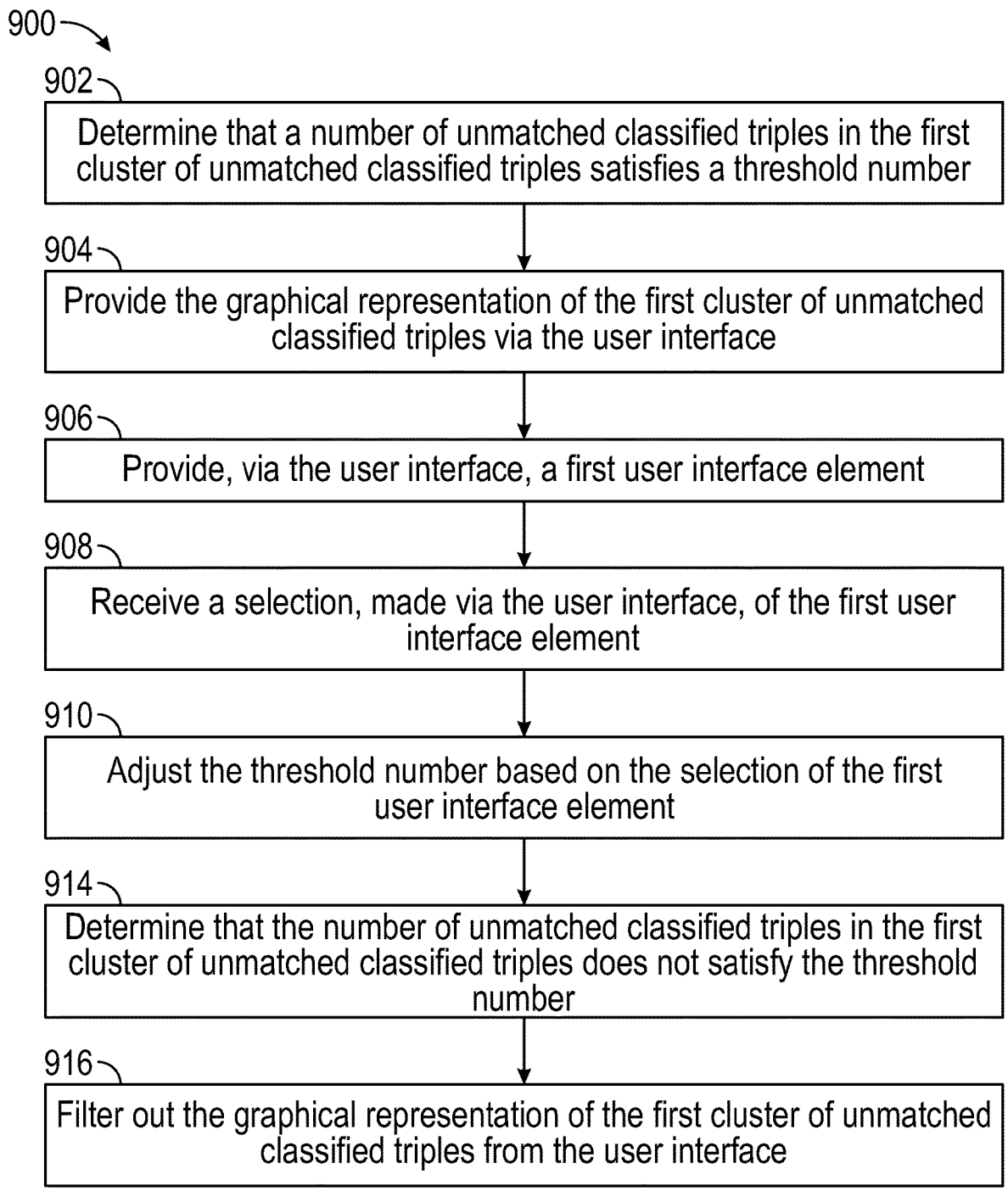
FIG. 9 is a flowchart depicting an example routine for adjusting a threshold number to filter out a cluster of unmatched classified triples that occurs less than the threshold number from being presented through a user interface, according to various implementations of the present disclosure.

FIG. 9 is an example flowchart depicting an example method 900 for adjusting a threshold number to filter out a cluster of unmatched classified triples that occurs less than the threshold number from being presented through a user interface (e.g., the user interface module 104), according to various implementations. In various implementations, part or all of the method 900 may be performed by the data extraction system 102 after the data extraction system 102 clusters the first subset of the plurality of unmatched classified triples into the first cluster of unmatched classified triples at block 704 of FIG. 7. In various implementations, part or all of the method 900 may be better understood with reference to the example user interface 1100 of FIG. 11.

At block 902, the data extraction system 102 may determine that a number of unmatched classified triples in the first cluster of unmatched classified triples satisfies a threshold number.

At block 904, in response to determining that the number of unmatched classified triples in the first cluster of unmatched classified triples satisfies the threshold number, the data extraction system 102 may provide a graphical representation of the first cluster of unmatched classified triples via the user interface module 104.

At block 906, the data extraction system 102 may optionally further provide, via the user interface module, a first user interface element, where the first user interface element may be a tool bar that allows the user 150 to adjust the threshold number. For example the first user interface element may be the user interface element 1160 of FIG. 11 that allows the user 150 to adjust the threshold number for showing unmatched classified triples that do not at least partially match one or more data object types defined in the ontology 105.

At block 908, the data extraction system 102 may receive a selection, made via the user interface module 104, of the first user interface element.

At block 910, the data extraction system 102 may adjust the threshold number based on the selection of the first user interface element. For example, as illustrated in FIG. 11, the threshold number may be adjusted upward to 228 from its current value 55 or downward to 0.

At block 914, the data extraction system 102 may determine that the number of unmatched classified triples in the first cluster of unmatched classified triples does not satisfy the threshold number. For example, the threshold number may increase based on the selection received at block 908 such that the number of unmatched classified triples in the first cluster of unmatched classified triples is less than the threshold number.

At block 916, in response to determining that the number of unmatched classified triples in the first cluster of unmatched classified triples does not satisfy the threshold number, the data extraction system 102 may filter out the graphical representation of the first cluster of unmatched classified triples from the user interface module 104. For example, assuming the unmatched "Group" entity type represented by the node 1104 as illustrated in FIG. 11 appear 60 times. Responsive to the user 150 manipulating the user interface element 1160 to increase the threshold number from 55 to, for example, 100, the unmatched "Group" entity type represented by the node 1104 will be removed (not shown in FIG. 11) from the interactive graphical representation 1150 of FIG. 11.

Example User Interfaces and Related Functionality

FIGS. 10A-10D show an example flow illustrating addition of a data object into the database 109 associated with the ontology 105 using a classified triple extracted from input text data that matches the ontology 105, according to various implementations of the present disclosure. The example flow may be performed by the data extraction system 102 of FIG. 1 or FIG. 2 automatically and/or in response to a user operation/input from the user 150. As shown in FIG. 10A, the data extraction system 102 may receive text data 1002 that may come from the data source 120. Additionally and/or optionally, the data extraction system 102 may prompt the user 150 to input the text data 1002 by presenting the message portion 1004 to the user 150 through the user interface module 104. Here, the text data 1002 reads "Bob earned a bachelor's degree from ABC College in 2004. Bob received a PhD degree from DEF College in 2016. While studying in DEF College, Bob is a roommate of Alice." The message portion 1004 reads "Enter input text into the text area below and create a graph visual:"

In various implementations, the data triple generator 112 may receive the text data 1002. Based on the text data 1002, the data triple generator 112 may generate a first prompt for a LLM (e.g., the LLM 130, the LLM 130a, or the LLM 130b), where the first prompt may include at least the text data 1002. The data triple generator 112 may then transmit the first prompt to the LLM, and receive a first output from the LLM in response to the first prompt.

FIG. 10B illustrates the first output that includes data triples 1006, 1008, 1010, 1012, and 1014. As shown in FIG. 10B, data triples 1006, 1008, 1010, 1012, and 1014 are extracted from the text data 1002 by the LLM. Here, the data triple 1006 shows ["Bob", "earned", "bachelor's degree"], the data triple 1008 shows ["Bob", "received", "PhD degree"], the data triple 1010 shows ["ABC College", "awarded", "bachelor's degree"], the data triple 1012 shows ["DEF College", "awarded", "PhD degree"], the data triple 1014 shows ["Bob", "roommate", "Alice"].

Based on the data triple in the first output from the LLM, the automated ontology pipeline 110 (e.g., the classified triple generator 114) may further generate a second prompt for the LLM, where the second prompt may include at least the data triples 1006, 1008, 1010, 1012, and 1014. The classified triple generator 114 may receive a second output from the LLM that includes the classified triples 1016, 1018 and 1020 as illustrated in FIG. 10C.

As shown in FIG. 10C, data triples 1006 and 1008 are classified (e.g., by the LLM) to the classified triple 1016, data triples 1010 and 1012 are classified to the classified triple 1018, and data triple 1014 is classified to the classified triple 1020. Although not illustrated in FIGS. 10A-10D, the ontology matching module 118 may execute a similarity search with reference to the ontology 105 to determine whether the classified triple 1016, 1018, and/or 1020 at least partially matches one or more data object types defined in the ontology 105. If the ontology matching module 118 determines that the classified triple 1016, 1018, and/or 1020 at least partially matches one or more data object types defined in the ontology 105, the data extraction system 102 (e.g., the automated ontology pipeline 110) may add into the database 109 a data object of a data object type that is defined in the ontology 105.

For example, as shown in FIG. 10D, the ontology matching module 118 may determine that the classified triple 1016 at least partially matches one or more data object types defined in the ontology 105 (e.g., the "Person" entity type matches a first data object defined in the ontology 105 and the "education degree" entity type matches a second data object defined in the ontology 105) and the data extraction system 102 may then automatically add the data object 201A (e.g., "Bob") and the data object 201B (e.g., "PhD degree") into the database 109, where the data object 201A may be of a first data object type defined in the ontology 105 that corresponds to the "Person" entity type and the data object 201B may be of a second data object type defined in the ontology 105 that corresponds to the "education degree" entity type.

Prior to the ontology matching module 118 executing the similarity search with reference to the ontology 105, the data extraction system 102 may optionally normalize relationship types between entity types in the classified triples 1016, 1018 and 1020. For example, as shown in FIG. 10B and FIG. 10C, the data triple 1006 has a relationship "earned" and the data triple 1008 has a relationship "received," and both relationships "earned" and "received" may be classified as a relationship type "earned" in the classified triple 1016 because of normalization. For example, the normalization module 116 may normalize a relationship type "received" of a classified triple (not shown in FIGS. 10A-10D) to the relationship type "earned" in the classified triple 1016. Advantageously, normalization of at least a portion of one or more classified triples may enable the ontology matching module 118 and/or the automated ontology pipeline 110 to more accurately extract, classify, identify, or search information within text data 1002 for adding data objects (e.g., 201A and 201B) into the database 109 or update the ontology 105 in consistent with definitions of the ontology 105 and/or objectives of an organization.

FIGS. 11-13 show example user interfaces that illustrate example interactive graphical representations of unmatched classified triples to allow the user 150 to more efficiently update the ontology 105 to define data object types or link types for enriching knowledge base of an organization by performing various user operations on the nodes or edges of the interactive graphical representations. The example user interfaces may be presented through the user interface module 104 of the data extraction system 102 of FIG. 1 and/or FIG. 2 or a user interface of the user 150. The example user interfaces may allow the user 150 to interact with the data extraction system 102 of FIG. 1 and/or FIG. 2 to update the ontology 105 and/or train the LLM 130, the LLM 130a, the LLM 130b.

As shown in FIG. 11, a user interface 1100 may include an interactive graphical representation 1150 that includes the nodes 1102, 1104, 1106, 1108, 1110, 1112, 1114, 1116, 1118, 1120, and 1122, and the edges 1132, 1134, 1136, and 1138. Each of the nodes 1102, 1104, 1106, 1108, 1110, 1112, 1114, 1116, 1118, 1120, and 1122 may represent an entity type that does not match any data object type defined in the ontology 105, and each of the edges 1132, 1134, 1136, and 1138 may represent a relationship type that does not match any link type between one or more data object types defined in the ontology 105. Here, the node 1102 represents the "Person" entity type, the node 1104 represents the "Group" entity type, the node 1106 represents the "Object" entity type, the node 1108 represents the "Action" entity type, the node 1110 represents the "Organization" entity type, and so forth. The edge 1132 represents the "made" relationship type, the edge 1134 represents the "was" relationship type, the edge 1136 represents the "sees" relationship type, the edge 1138 represents the "provided" relationship type.

The user interface 1100 may further include a user interface element 1160 that allows the user 150 to adjust a threshold number for showing unmatched classified triples that do not at least partially match one or more data object types defined in the ontology 105. Here, the threshold number is set at 55, which may indicate that entity type(s) and/or relationship type(s) that do not match data object type(s) and/or link type(s) defined in the ontology 105 need to have corresponding appearances in the text data received from the data source 120 for at least 55 times to be included in the interactive graphical representation 1150.

FIG. 12 shows a cluster of unmatched classified triples 1202 in a user interface 1200, where the cluster of unmatched classified triples 1202 is represented by the node 1102, the node 1108, and the edge 1132 of the interactive graphical representation 1150 of FIG. 11. The cluster of unmatched classified triples 1202 may be presented through the user interface 1200 by the user interface module 104 in response to the user 150 operating on (e.g., selecting) the node 1102, the node 1108, and/or the edge 1132. As noted in FIG. 11 regarding the threshold number (e.g., 55 as shown in FIG. 11), a number of unmatched classified triples in the cluster of unmatched classified triples 1202 may exceed the threshold number such that the node 1102, the node 1108, and/or the edge 1132 associated with the cluster of unmatched classified triples 1202 may be presented by the interactive graphical representation 1150 of FIG. 11. As shown in FIG. 12, the cluster of unmatched classified triples 1202 (PERSON < > MADE < > ACTION) has a cluster identification (ID) 368 and includes sub-clusters 1204, 1206, 1208, 1210, 1212, 1214, 1216, 1218, 1220, 1222, and 1224. The cluster of unmatched classified triples 1202 further shows number of appearance (e.g., count), entity types, and a relationship type of each of the sub-clusters 1204, 1206, 1208, 1210, 1212, 1214, 1216, 1218, 1220, 1222, and 1224 that may be informative to the user 150.

For example, the sub-cluster 1204 may have a relationship type ("wanted") that may not be exactly the same as a relationship type ("chose") of the sub-cluster 1212 but the sub-cluster 1204 and the sub-cluster 1212 may nevertheless be clustered under the cluster of unmatched classified triples 1202 based on normalizing their relationship types (e.g., performed by the normalization module 116). As another example, the sub-cluster 1222 is shown to have a "Location" entity type that is different from other sub-clusters under the cluster of unmatched classified triples 1202, which may indicate to the user 150 that the sub-cluster 1222 may be misclassified by a LLM (e.g., the LLM 130, the LLM 130a, and/or the LLM 130b). This indication may allow the user 150 to cause the data extraction system 102 to generate training data and optionally train the LLM and/or update a prompt to the LLM using the training data so that the LLM may better classify data triples.

FIG. 13 illustrates an example user interface 1300 including an interactive graphical representation 1350 that may indicate an update to the ontology 105 based on one or more user operations from the user 150. The interactive graphical representation 1350 may result from one or more user operations performed by the user 150 to the interactive graphical representation 1150 of FIG. 11. Although not fully illustrated in FIG. 13, the user 150 may perform any kind of operations (e.g., group, ungroup, move, remove, associate, disassociate, enclose, or the like) on the node(s) and/or edge(s) of the interactive graphical representation 1350 to create data object type, add one or more property types to a data object type to be created, and/or remove one or more property types from the data object type to be created. As shown in FIG. 13, the user interface module 104 may receive a user operation to the node 1102, where the user operation indicates (e.g., through enclosing the node 1102 using a rectangular-like shape 1330) that the "Person" entity type represented by the node 1102 is to be defined in the ontology 105 as a first data object type that was previously undefined in the ontology 105. Based at least in part on the user operation to the node 1102, the data extraction system 102 may update the ontology 105 to include the first data object type corresponding to the "Person" entity type represented by the node 1102. Based on updating the ontology 105 to include the first data object type corresponding to the "Person" entity type represented by the node 1102, the data extraction system 102 may further add into the database 109 one or more first data objects of the first data object type, where the one or more first data objects may represent one or more first entities that are in the text data received from the data source 120.

Additionally, as shown in FIG. 13, the user interface module 104 may receive a user operation that associates the node 1104 and the node 1110 (e.g., moving the node 1110 toward the node 1104), where the user operation may indicate (e.g., through enclosing the node 1104 and the node 1110 using a rectangular-like shape 1340 after the node 1110 is moved toward the node 1104) that the "Organization" entity type represented by the node 1110 is to be added as a first property of a second data object type that is to be defined in the ontology 105 and corresponding to the entity type represented by the node 1104. Based at least in part on the user interface module 104 receiving the user operation, the data extraction system 102 may update the ontology 105 to include the second data object type corresponding to the "Group" entity type represented by the node 1104, and a first property type of the second data object type based on the "Organization" entity type represented by the node 1110. Based on the updated ontology 105 that includes the second data object type having the first property type, the data extraction system 102 may further add into the database 109 one or more second data objects of the second data object types having the first property type.

Although not illustrated in FIG. 13, the user interface module 104 may further receive a further user operation that disassociates the node 1104 and the node 1110 (e.g., moving the node 1110 away from the node 1104) after receiving the user operation that associates the node 1104 and the node 1110. In response to the further user operation, the data extraction system 102 may update the ontology 105 to include the second data object type corresponding to the "Group" entity type represented by the node 1104, and a third data object type corresponding to the "Organization" entity type represented by the node 1110. As such, the data extraction system 102 may further provide the user 150 the flexibility to update the ontology 105 by changing a property type (e.g., "Organization") of a data object type to another data object type. It should be noted that other user operations on the interactive graphical representations 1150 and 1350 can also be facilitated by the data extraction system 102 through the user interface module 104 such that the user 150 can define various data object types having various property types and/or generate various data object of data object types by grouping and/or separating nodes of the interactive graphical representations 1150 and 1350.

Figure 14:
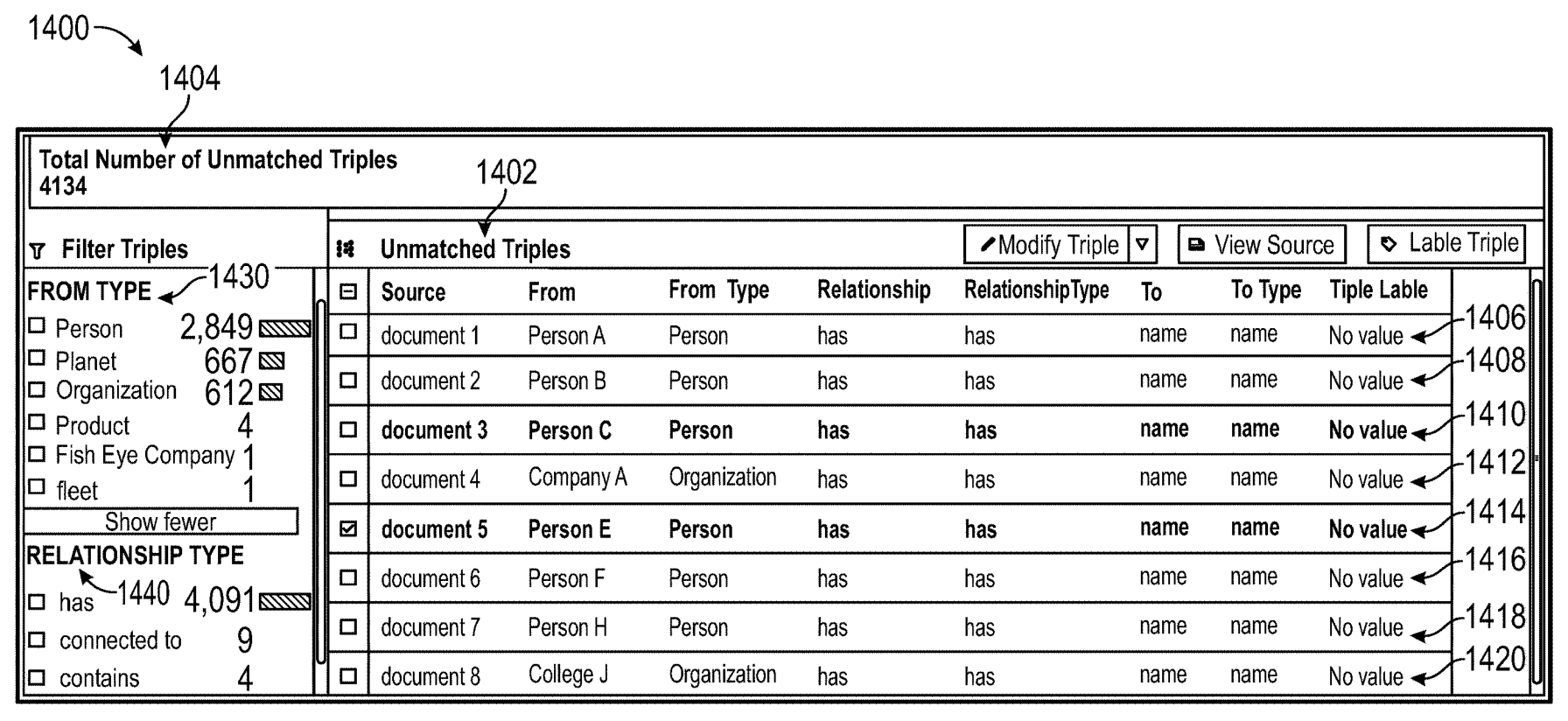

FIG. 14 illustrates an example user interface 1400 that shows a list 1402 that includes a plurality of unmatched classified triples. As shown in FIG. 14, the display portion

1404 shows that the total number of the plurality of unmatched classified triples is 4134, which may indicate an amount of classified triples extracted from text data received from the data source 120 that do not at least partially match one or more data object types defined in the ontology 105. The plurality of unmatched classified triples may include the unmatched classified triple 1406, the unmatched classified triple 1408, the unmatched classified triple 1410, the unmatched classified triple 1412, the unmatched classified triple 1414, the unmatched classified triple 1416, the unmatched classified triple 1418, and the unmatched classified triple 1420. For each of the unmatched classified triples, the list 1402 may show a source of the unmatched classified triple, an entity or entities of the unmatched classified triple, and a relationship type of the unmatched classified triple. For example, the list 1402 indicates that the unmatched classified triple 1406 may be extracted from "document 1" and may be classified from a data triple that includes an entity ("Person A"), where the entity ("Person A") is classified to an entity type ("Person").

Additionally, the user interface 1400 may further include the display portion 1430 and the display portion 1440 that show number of appearances of entity types and relationship types in the plurality of unmatched classified triples. As shown in the display portion 1430, the "Person" entity type appears 2849 times in the list 1402 of the plurality of unmatched classified triples, the "Planet" entity type appears 667 times, and the "Organization" entity type appears 612 times. As shown in the display portion 1440, the "has" relationship type appears 4091 times in the list 1402 of the plurality of unmatched classified triples. The number of appearances of entity types and relationship types in the list 1402 of the plurality of unmatched classified triples may indicate to the user 150 based on what entity and/or relationship types the ontology 105 should be updated such that more entity types and/or relationship types extracted from text data from the data source 120 can match one or more data object types and/or link types defined in the ontology 105. For example, the display portion 1430 and the display portion 1440 may indicate to the user 150 that the ontology 105 should be updated by the data extraction system 102 at least to define a data object type and a link type that matches the "Person" entity type and the "has" relationship type, respectively.

FIG. 15 illustrates an example user interface 1500 that allows the user 150 to provide feedback to the data extraction system 102 and/or one or more LLMs (e.g., the LLM 130, the LLM 130a, the LLM 130b). Specifically, the user interface 1500 may be presented via the user interface module 104 in response to a user operation (e.g., selecting or clicking) to an unmatched classified triple 1422 in the list 1402 (not shown in FIG. 14 but shown in FIG. 15) of the plurality of unmatched classified triples, where the unmatched classified triple 1422 includes the entities "Person J" and "Company J."

As shown in FIG. 15, a dialog box 1540 that states "Classify Triple" may allow a user, such as the user 150, to provide feedback to indicate issue(s) associated with the unmatched classified triple 1422. The dialog box 1540 may include a display portion 1546 that shows an identification number of the unmatched classified triple 1422. In various implementations, the user interface 1500 includes the menu 1542 to allow the user 150 to update the ontology 105 using entity type(s) in the unmatched classified triple 1422. Here, the menu 1542 reads "Modify Ontology: New ObjectType," indicating the data extraction system 102 may update the ontology 105 to define a data object type that matches with entity type(s) in the unmatched classified triple 1422 if the operation specified in the menu 1542 is implemented or performed by the data extraction system 102.

The user interface 1500 may further include the search column 1544 to allow the user 150 to key-in, search, and/or identify an issue associated with the unmatched classified triple 1422, where the issue may be that a first entity type 1548 of the unmatched classified triple 1422 is misclassified (e.g., by the LLM 130, the LLM 130a, and/or the LLM 130b) as indicated by the display portion 1554, a second entity type 1550 of the unmatched classified triple 1422 is misclassified as indicated by the display portion 1556, or a relationship type 1552 of the unmatched classified triple 1422 is misclassified as indicated by the display portion 1558. Additionally, the user interface 1500 may further include the display portion 1560 that reads "Poor Triple Extraction," which may be selected by the user 150 to indicate to the data extraction system 102 that the first entity type 1548 or the second entity type 1550 of the unmatched classified triple 1422 does not match any data object type(s) because a data triple from which the unmatched classified triple 1422 is classified is not properly extracted from text data that may be received by the data extraction system 102 from the data source 120.

Responsive to the user 150 selecting the display portions 1556, 1558, 1554, or 1560, the data extraction system 102 may generate training data based on the user selection and optionally train a LLM and/or update a prompt to the LLM using the training data. As such, the LLM(s) that was tasked to classify a data triple from which the unmatched classified triple 1422 is classified may be trained to better classify classified triples from data triples and/or extract data triples from text data.

Alternatively, the user 150 may select the display portion 1562 or the display portion 1564 to indicate to the data extraction system 102 that the ontology 105 should be updated to define data object type(s) and/or link type(s) such that the first entity type 1548 or the second entity type 1550 of the unmatched classified triple 1422 may match the updated ontology 105.

Additional Example Implementations and Details

In an implementation of the system (e.g., one or more aspects of the data extraction system 102, one or more aspects of the computing environment 100, and/or the like) may comprise, or be implemented in, a "virtual computing environment". As used herein, the term "virtual computing environment" should be construed broadly to include, for example, computer-readable program instructions executed by one or more processors (e.g., as described in the example of FIG. 16) to implement one or more aspects of the modules and/or functionality described herein. Further, in this implementation, one or more services/modules/engines and/or the like of the system may be understood as comprising one or more rules engines of the virtual computing environment that, in response to inputs received by the virtual computing environment, execute rules and/or other program instructions to modify operation of the virtual computing environment. For example, a request received from a user computing device may be understood as modifying operation of the virtual computing environment to cause the request access to a resource from the system. Such functionality may comprise a modification of the operation of the virtual computing environment in response to inputs and according to various rules. Other functionality implemented by the virtual computing environment (as described throughout this disclosure) may further comprise modifications of the operation of the virtual computing environment, for example, the operation of the virtual computing environment may change depending on the information gathered by the system. Initial operation of the virtual computing environment may be understood as an establishment of the virtual computing environment. In various implementations the virtual computing environment may comprise one or more virtual machines, containers, and/or other types of emulations of computing systems or environments. In various implementations the virtual computing environment may comprise a hosted computing environment that includes a collection of physical computing resources that may be remotely accessible and may be rapidly provisioned as needed (commonly referred to as "cloud" computing environment).

Implementing one or more aspects of the system as a virtual computing environment may advantageously enable executing different aspects or modules of the system on different computing devices or processors, which may increase the scalability of the system. Implementing one or more aspects of the system as a virtual computing environment may further advantageously enable sandboxing various aspects, data, or services/modules of the system from one another, which may increase security of the system by preventing, e.g., malicious intrusion into the system from spreading. Implementing one or more aspects of the system as a virtual computing environment may further advantageously enable parallel execution of various aspects or modules of the system, which may increase the scalability of the system. Implementing one or more aspects of the system as a virtual computing environment may further advantageously enable rapid provisioning (or de-provisioning) of computing resources to the system, which may increase scalability of the system by, e.g., expanding computing resources available to the system or duplicating operation of the system on multiple computing resources. For example, the system may be used by thousands, hundreds of thousands, or even millions of users simultaneously, and many megabytes, gigabytes, or terabytes (or more) of data may be transferred or processed by the system, and scalability of the system may enable such operation in an efficient and/or uninterrupted manner.

Various implementations of the present disclosure may be a system, a method, and/or a computer program product at any possible technical detail level of integration. The computer program product may include a computer-readable storage medium (or mediums) having computer-readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer-readable storage medium (or mediums). Computer-readable storage mediums may also be referred to herein as computer-readable storage or computer-readable storage devices.

The computer-readable storage medium can be a tangible device that can retain and store data and/or instructions for use by an instruction execution device. The computer-readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions (as also referred to herein as, for example, "code," "instructions," "module," "application," "software application," "service," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. Computer-readable program instructions may be callable from other instructions or from itself, and/or may be invoked in response to detected events or interrupts. Computer-readable program instructions configured for execution on computing devices may be provided on a computer-readable storage medium, and/or as a digital download (and may be originally stored in a compressed or installable format that requires installation, decompression, or decryption prior to execution) that may then be stored on a computer-readable storage medium. Such computer-readable program instructions may be stored, partially or fully, on a memory device (e.g., a computer-readable storage medium) of the executing computing device, for execution by the computing device. The computer-readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In various implementations, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to implementations of the disclosure. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart(s) and/or block diagram(s) block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid-state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid-state drive) either before or after execution by the computer processor.

The flowcharts and block diagrams in the Figures illustrate the architecture, functionality, and operation of possible implementations of systems, methods, and computer program products according to various implementations of the present disclosure. In this regard, each block in the flowchart or block diagrams may represent a service, module, segment, or portion of instructions, which comprises one or more executable instructions for implementing the specified logical function(s). In various alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted or optional in various implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, and/or the like with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above implementations may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows 11, Windows Server, and/or the like), Windows CE, Unix, Linux, SunOS, Solaris, Blackberry OS, VxWorks, or other suitable operating systems. In other implementations, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 16:
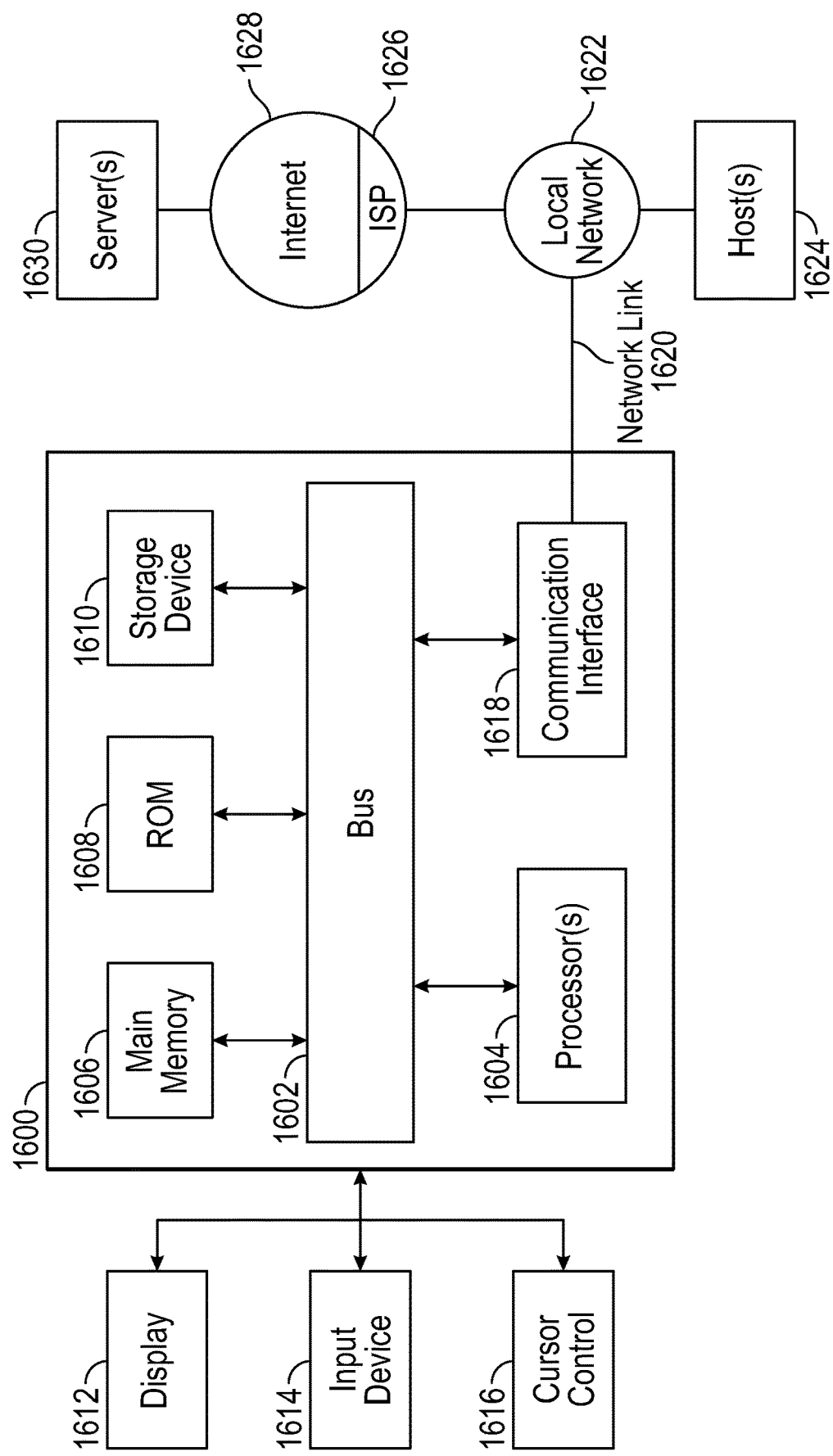
FIG. 16 is a block diagram of an example computer system consistent with various implementations of the present disclosure.

For example, FIG. 16 shows a block diagram that illustrates a computer system 1600 upon which various implementations and/or aspects (e.g., one or more aspects of the computing environment 100, one or more aspects of the data extraction system 102, one or more aspects of the user 150, one or more aspects of the data source 120, one or more aspects of the LLMs 130a and 130b, and/or the like) may be implemented. Multiple such computer systems 1600 may be used in various implementations of the present disclosure. Computer system 1600 includes a bus 1602 or other communication mechanism for communicating information, and a hardware processor, or multiple processors, 1604 coupled with bus 1602 for processing information. Hardware processor(s) 1604 may be, for example, one or more general purpose microprocessors.

Computer system 1600 also includes a main memory 1606, such as a random-access memory (RAM), cache and/or other dynamic storage devices, coupled to bus 1602 for storing information and instructions to be executed by processor 1604. Main memory 1606 also may be used for storing temporary variables or other intermediate information during execution of instructions to be executed by processor 1604. Such instructions, when stored in storage media accessible to processor 1604, render computer system 1600 into a special-purpose machine that is customized to perform the operations specified in the instructions. The main memory 1606 may, for example, include instructions to implement server instances, queuing modules, memory queues, storage queues, user interfaces, and/or other aspects of functionality of the present disclosure, according to various implementations.

Computer system 1600 further includes a read only memory (ROM) 1608 or other static storage device coupled to bus 1602 for storing static information and instructions for processor 1604. A storage device 1610, such as a magnetic disk, optical disk, or USB thumb drive (Flash drive), and/or the like, is provided and coupled to bus 1602 for storing information and instructions.

Computer system 1600 may be coupled via bus 1602 to a display 1612, such as a cathode ray tube (CRT) or LCD display (or touch screen), for displaying information to a computer user. An input device 1614, including alphanumeric and other keys, is coupled to bus 1602 for communicating information and command selections to processor 1604. Another type of user input device is cursor control 1616, such as a mouse, a trackball, or cursor direction keys for communicating direction information and command selections to processor 1604 and for controlling cursor movement on display 1612. This input device typically has two degrees of freedom in two axes, a first axis (e.g., x) and a second axis (e.g., y), that allows the device to specify positions in a plane. In various implementations, the same direction information and command selections as cursor control may be implemented via receiving touches on a touch screen without a cursor.

Computer system 1600 may include a user interface module to implement a GUI that may be stored in a mass storage device as computer executable program instructions that are executed by the computing device(s). Computer system 1600 may further, as described below, implement the techniques described herein using customized hard-wired logic, one or more ASICs or FPGAs, firmware and/or program logic which in combination with the computer system causes or programs computer system 1600 to be a special-purpose machine. According to one implementation, the techniques herein are performed by computer system 1600 in response to processor(s) 1604 executing one or more sequences of one or more computer-readable program instructions contained in main memory 1606. Such instructions may be read into main memory 1606 from another storage medium, such as storage device 1610. Execution of the sequences of instructions contained in main memory 1606 causes processor(s) 1604 to perform the process steps described herein. In alternative implementations, hard-wired circuitry may be used in place of or in combination with software instructions.

Various forms of computer-readable storage media may be involved in carrying one or more sequences of one or more computer-readable program instructions to processor 1604 for execution. For example, the instructions may initially be carried on a magnetic disk or solid-state drive of a remote computer. The remote computer can load the instructions into its dynamic memory and send the instructions over a telephone line using a modem. A modem local to computer system 1600 can receive the data on the telephone line and use an infra-red transmitter to convert the data to an infra-red signal. An infra-red detector can receive the data carried in the infra-red signal and appropriate circuitry can place the data on bus 1602. Bus 1602 carries the data to main memory 1606, from which processor 1604 retrieves and executes the instructions. The instructions received by main memory 1606 may optionally be stored on storage device 1610 either before or after execution by processor 1604.

Computer system 1600 also includes a communication interface 1618 coupled to bus 1602. Communication interface 1618 provides a two-way data communication coupling to a network link 1620 that is connected to a local network 1622. For example, communication interface 1618 may be an integrated services digital network (ISDN) card, cable modem, satellite modem, or a modem to provide a data communication connection to a corresponding type of telephone line. As another example, communication interface 1618 may be a local area network (LAN) card to provide a data communication connection to a compatible LAN (or WAN component to communicated with a WAN). Wireless links may also be implemented. In any such implementation, communication interface 1618 sends and receives electrical, electromagnetic, or optical signals that carry digital data streams representing various types of information.

Network link 1620 typically provides data communication through one or more networks to other data devices. For example, network link 1620 may provide a connection through local network 1622 to a host computer 1624 or to data equipment operated by an Internet Service Provider (ISP) 1626. ISP 1626 in turn provides data communication services through the worldwide packet data communication network now commonly referred to as the "Internet" 1628. Local network 1622 and Internet 1628 both use electrical, electromagnetic, or optical signals that carry digital data streams. The signals through the various networks and the signals on network link 1620 and through communication interface 1618, which carry the digital data to and from computer system 1600, are example forms of transmission media.

Computer system 1600 can send messages and receive data, including program code, through the network(s), network link 1620 and communication interface 1618. In the Internet example, a server 1630 might transmit a requested code for an application program through Internet 1628, ISP 1626, local network 1622 and communication interface 1618.

The received code may be executed by processor 1604 as it is received, and/or stored in storage device 1610, or other non-volatile storage for later execution.

As described above, in various implementations certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain implementations, one or more of the computing devices and/or systems of the disclosure may include mobile computing devices, and user interfaces may be accessible through such mobile computing devices (for example, smartphones and/or tablets).

Many variations and modifications may be made to the above-described implementations, the elements of which are to be understood as being among other acceptable examples. All such modifications and variations are intended to be included herein within the scope of this disclosure. The foregoing description details certain implementations. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain implementations include, while other implementations do not include, certain features, elements, and/or steps. Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, and/or the like may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain implementations require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general-purpose computer comprising one or more processors should not be interpreted as excluding other computer components, and may possibly include such components as memory, input/output devices, and/or network interfaces, among others.

While the above detailed description has shown, described, and pointed out novel features as applied to various implementations, it may be understood that various omissions, substitutions, and changes in the form and details of the devices or processes illustrated may be made without departing from the spirit of the disclosure. As may be recognized, certain implementations of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

Example Clauses

Examples of implementations of the present disclosure can be described in view of the following example clauses. The features recited in the below example implementations can be combined with additional features disclosed herein. Furthermore, additional inventive combinations of features are disclosed herein, which are not specifically recited in the below example implementations, and which do not include the same features as the specific implementations below. For sake of brevity, the below example implementations do not identify every inventive aspect of this disclosure. The below example implementations are not intended to identify key features or essential features of any subject matter described herein. Any of the example clauses below, or any features of the example clauses, can be combined with any one or more other example clauses, or features of the example clauses or other features of the present disclosure.

Clause 1. A computerized method, performed by a computing system having one or more hardware computer processors and one or more computer-readable storage devices storing software instructions executable by the computing system, the computerized method comprising: receiving text data from a data source; generating a first prompt for a large language model ("LLM"), the first prompt comprising at least the text data; transmitting the first prompt to the LLM; receiving a first output from the LLM in response to the first prompt, the first output comprising at least a data triple extracted from the text data, the data triple including a first entity, a second entity, and a relationship between the first entity and the second entity; generating a second prompt for the LLM, the second prompt comprising at least the data triple; transmitting the second prompt to the LLM; receiving a second output from the LLM, the second output comprising at least a classified triple, the classified triple including a first entity type that the first entity is classified to, a second entity type that the second entity is classified to, and a relationship type that the relationship between the first entity and the second entity is classified to; executing, using the classified triple, a similarity search with reference to an ontology to determine that the classified triple at least partially matches one or more data object types defined in the ontology; and in response to the determination, adding into a first database at least: a first data object of a first data object type, the first data object representing the first entity, and a second data object of a second data object type, the second data object representing the second entity.

Clause 2. The computerized method of Clause 1, wherein the first prompt comprises an example text data and an example data triple that is based on the example text data.

Clause 3. The computerized method of any of Clauses 1-2, wherein the second prompt comprises a plurality of data object types defined in the ontology.

Clause 4. The computerized method of Clause 3, wherein the second prompt requests that the LLM to classify the data triple into the classified triple using the plurality of data object types.

Clause 5. The computerized method of any of Clauses 1-4, wherein the second prompt comprises an example classification that classifies an example data triple to an example classified triple.

Clause 6. The computerized method of any of Clauses 1-5 further comprising: normalizing the relationship type prior to executing the similarity search with reference to the ontology.

Clause 7. The computerized method of Clause 6, wherein normalizing the relationship type uses a plurality of link types defined in the ontology.

Clause 8. The computerized method of Clause 6, wherein normalizing the relationship type comprises vectorizing the relationship type into a vector.

Clause 9. The computerized method of any of Clauses 1-8 further comprising: providing, via a user interface, a first graphical representation of the first output from the LLM.

Clause 10. The computerized method of Clause 9, wherein the relationship between the first entity and the second entity is represented in the first graphical representation as an edge connecting the first entity and the second entity.

Clause 11. The computerized method of any of Clauses 1-10 further comprising: providing, via a user interface, a second graphical representation of the second output from the LLM.

Clause 12. The computerized method of Clause 11, wherein the relationship type is represented in the second graphical representation as an edge connecting the first entity type and the second entity type.

Clause 13. The computerized method of any of Clauses 1-12, wherein the first entity type is different from or same as the second entity type.

Clause 14. The computerized method of any of Clauses 1-13, wherein the first entity type matches the first data object type if the first entity type exceeds a threshold similarity with the first data object type.

Clause 15. The computerized method of any of Clauses 1-14, wherein the text data comprises natural language text.

Clause 16. The computerized method of any of Clauses 1-15, wherein determining that the classified triple at least partially matches one or more data object types defined in the ontology comprises: determining that the first entity type matches the first data object type defined in the ontology; determining that the second entity type matches the second data object type defined in the ontology; and determining that the relationship type matches a link type between the first data object type and the second data object type, the link type defined in the ontology.

Clause 17. The computerized method of any of Clauses 1-16 further comprising: executing, using a second classified triple, the similarity search with reference to the ontology to determine that: the first entity type or the second entity type does not match any data object type defined in the ontology, or the relationship type does not match any link type between one or more data object types defined in the ontology; and in response to the determination, storing the second classified triple into a second database that stores a plurality of unmatched classified triples.

Clause 18. The computerized method of any of Clauses 1-15 further comprising: in response to the determination, adding into the first database a link of a link type that links the first data object and the second data object, the link representing the relationship between the first entity and the second entity, wherein the first database stores a plurality of data objects of data object types defined in the ontology.

Clause 19. A system comprising: one or more computer-readable storage mediums having program instructions embodied therewith; and one or more processors configured to execute the program instructions to cause the system to perform the computerized method of any of Clauses 1-17.

Clause 20. A computer program product comprising one or more computer-readable storage mediums having program instructions embodied therewith, the program instructions executable by one or more processors to cause the one or more processors to perform the computerized method of any of Clauses 1-17.

Clause 21. A computerized method, performed by a computing system having one or more hardware computer processors and one or more computer-readable storage devices storing software instructions executable by the computing system, the computerized method comprising: accessing one or more databases that store a plurality of unmatched classified triples, wherein each of a first subset of the plurality of unmatched classified triples comprises a first entity type, a second entity type, and a relationship type between the first entity type and the second entity type, and wherein the first entity type or the second entity type does not match any data object type defined in an ontology or the relationship type does not match any link type between one or more data object types defined in the ontology; clustering, based at least on the first entity type, the second entity type, and the relationship type of each of the first subset of the plurality of unmatched classified triples, each of the first subset of the plurality of unmatched classified triples into a first cluster of unmatched classified triples; providing, via a user interface, an interactive graphical representation of the first cluster of unmatched classified triples, wherein the interactive graphical representation comprises a first node representing the first entity type, a second node representing the second entity type, and a first edge connecting the first node and the second node; receiving a first user operation, made via the interactive graphical representation of the user interface, to at least the first node; and based at least in part on receiving the first user operation, updating the ontology to include a first data object type corresponding to the first entity type represented by the first node.

Clause 22. The computerized method of Clause 21, wherein receiving the first user operation comprises receiving an indication that the first entity type represented by the first node is to be defined in the ontology as the first data object type, and wherein updating the ontology comprises defining the first data object type in the ontology.

Clause 23. The computerized method of any of Clauses 21-22 further comprising: based at least in part on updating the ontology, adding into the one or more databases a first data object of the first data object type, the first data object representing the first entity.

Clause 24. The computerized method of any of Clauses 21-23 further comprising: receiving text data from a data source; generating a first prompt for a large language model ("LLM"), the first prompt comprising at least the text data; transmitting the first prompt to the LLM; receiving a first output from the LLM in response to the first prompt, the first output comprising at least a data triple extracted from the first prompt, the data triple including a first entity, a second entity, and a relationship between the first entity and the second entity; generating a second prompt for the LLM, the second prompt comprising at least the data triple; transmitting the second prompt to the LLM; receiving a second output from the LLM, the second output comprising at least a classified triple, the classified triple including the first entity type that the first entity is classified to, the second entity type that the second entity is classified to, and the relationship type that the relationship between the first entity and the second entity is classified to; and storing the classified triple into the one or more databases that store the plurality of unmatched classified triples, wherein the classified triple is one of the first subset of the plurality of unmatched classified triples.

Clause 25. The computerized method of any of Clauses 21-24 further comprising: providing, via the user interface, a list that includes the plurality of unmatched classified triples, wherein the list includes each of the first subset of the plurality of unmatched classified triples.

Clause 26. The computerized method of Clause 25 further comprising: receiving a selection, made via the user interface, of a first unmatched classified triple of the plurality of unmatched classified triples; in response to receiving the selection of the first unmatched classified triple, providing a first user interface element that prompts a user to identify one or more issues associated with the first unmatched classified triple; receiving an identification, made via the user interface, that identifies a first issue associated with the first unmatched classified triple; and in response to receiving the identification, updating the ontology based on the identification.

Clause 27. The computerized method of Clause 24 further comprising: receiving a selection, made via the user interface, of the first unmatched classified triple; in response to receiving the selection of the first unmatched classified triple, providing a first user interface element that prompts a user to identify one or more issues associated with the first unmatched classified triple; receiving an identification, made via the user interface, that identifies a second issue associated with the first unmatched classified triple; in response to receiving the identification, generating training data based at least on the identification; and optionally training the LLM and/or updating a prompt to the LLM using the training data.

Clause 28. The computerized method of any of Clauses 27, wherein the text data comprises natural language text.

Clause 29. The computerized method of any of Clauses 21-28, further comprising: determining that a number of unmatched classified triples in the first cluster of unmatched classified triples satisfies a threshold number; and in response to determining that the number of unmatched classified triples in the first cluster of unmatched classified triples satisfies the threshold number, providing the graphical representation of the first cluster of unmatched classified triples via the user interface.

Clause 30. The computerized method of Clause 29, further comprising: providing, via the user interface, a first user interface element; receiving a selection, made via the user interface, of the first user interface element; adjusting the threshold number based on the selection of the first user interface element; determining that the number of unmatched classified triples in the first cluster of unmatched classified triples does not satisfy the threshold number; and in response to determining that the number of unmatched classified triples in the first cluster of unmatched classified triples does not satisfy the threshold number, filtering out the graphical representation of the first cluster of unmatched classified triples from the user interface.

Clause 31. The computerized method of any of Clauses 21-30, further comprising: providing, via the user interface, a third node that represents a third entity type that is undefined in the ontology; receiving a second user operation, made via the interactive graphical representation of the user interface, associating the third node with the second node; and based at least in part on receiving the second user operation, updating the ontology to include a second data object type corresponding to the second entity type represented by the second node, and a first property of the second data object type based on the third entity type represented by the third node.

Clause 32. The computerized method of Clause 31 further comprising: providing, via the user interface, a graphical representation of a second cluster of unmatched triples.

Clause 33. The computerized method of Clause 32, wherein the graphical representation of the second cluster of unmatched triples includes the first node representing the first entity type, a third node representing a third entity type, and a second edge connecting the first node and the third node.

Clause 34. A system comprising: one or more computer-readable storage mediums having program instructions embodied therewith; and one or more processors configured to execute the program instructions to cause the system to perform the computerized method of any of Clauses 21-33.

Clause 35. A computer program product comprising one or more computer-readable storage mediums having program instructions embodied therewith, the program instructions executable by one or more processors to cause the one or more processors to perform the computerized method of any of Clauses 21-33.

What is claimed is:

1. A computerized method, performed by a computing system having one or more hardware computer processors and one or more computer-readable storage devices storing software instructions executable by the computing system, the computerized method comprising:
receiving text data from a data source;
generating a first prompt for a large language model ("LLM"), the first prompt comprising at least the text data;
transmitting the first prompt to the LLM;
receiving a first output from the LLM in response to the first prompt, the first output comprising at least a data triple extracted from the text data, the data triple including a first entity, a second entity, and a relationship between the first entity and the second entity;
generating a second prompt for the LLM, the second prompt comprising at least the data triple;
transmitting the second prompt to the LLM;
receiving a second output from the LLM, the second output comprising at least a classified triple, the classified triple including a first entity type that the first entity is classified to, a second entity type that the second entity is classified to, and a relationship type that the relationship between the first entity and the second entity is classified to;
executing, using the classified triple, a similarity search with reference to an ontology to determine that the classified triple at least partially matches one or more data object types defined in the ontology; and
in response to the determination, adding into a first database at least:
a first data object of a first data object type, the first data object representing the first entity, and
a second data object of a second data object type, the second data object representing the second entity.

2. The computerized method of claim 1, wherein the first prompt comprises an example text data and an example data triple that is based on the example text data.

3. The computerized method of claim 1, wherein the second prompt comprises a plurality of data object types defined in the ontology.

4. The computerized method of claim 3, wherein the second prompt requests that the LLM to classify the data triple into the classified triple using the plurality of data object types.

5. The computerized method of claim 1, wherein the second prompt comprises an example classification that classifies an example data triple to an example classified triple.

6. The computerized method of claim 1 further comprising:
normalizing the relationship type prior to executing the similarity search with reference to the ontology.

7. The computerized method of claim 6, wherein normalizing the relationship type uses a plurality of link types defined in the ontology.

8. The computerized method of claim 6, wherein normalizing the relationship type comprises vectorizing the relationship type into a vector.

9. The computerized method of claim 1 further comprising:
providing, via a user interface, a first graphical representation of the first output from the LLM.

10. The computerized method of claim 9, wherein the relationship between the first entity and the second entity is represented in the first graphical representation as an edge connecting the first entity and the second entity.

11. The computerized method of claim 1 further comprising:
providing, via a user interface, a second graphical representation of the second output from the LLM.

12. The computerized method of claim 11, wherein the relationship type is represented in the second graphical representation as an edge connecting the first entity type and the second entity type.

13. The computerized method of claim 1, wherein the first entity type is different from or same as the second entity type.

14. The computerized method of claim 1, wherein the first entity type matches the first data object type if the first entity type exceeds a threshold similarity with the first data object type.

15. The computerized method of claim 1, wherein the text data comprises natural language text.

16. The computerized method of claim 1, wherein determining that the classified triple at least partially matches one or more data object types defined in the ontology comprises:
determining that the first entity type matches the first data object type defined in the ontology;
determining that the second entity type matches the second data object type defined in the ontology; and
determining that the relationship type matches a link type between the first data object type and the second data object type, the link type defined in the ontology.

17. The computerized method of claim 1 further comprising:
executing, using a second classified triple, the similarity search with reference to the ontology to determine that:
the first entity type or the second entity type does not match any data object type defined in the ontology, or
the relationship type does not match any link type between one or more data object types defined in the ontology; and
in response to the determination, storing the second classified triple into a second database that stores a plurality of unmatched classified triples.

18. The computerized method of claim 1 further comprising:
in response to the determination, adding into the first database a link of a link type that links the first data object and the second data object, the link representing the relationship between the first entity and the second entity,
wherein the first database stores a plurality of data objects of data object types defined in the ontology.

19. A system comprising:
one or more computer-readable storage mediums having program instructions embodied therewith; and
one or more processors configured to execute the program instructions to cause the system to perform the computerized method of claim 1.

20. A computer program product comprising one or more computer-readable storage mediums having program instructions embodied therewith, the program instructions executable by one or more processors to cause the one or more processors to perform the computerized method of claim 1.

* * * * *